(12) United States Patent
Farmanbar et al.

(10) Patent No.: US 11,569,961 B2
(45) Date of Patent: Jan. 31, 2023

(54) REFERENCE SIGNALING OVERHEAD REDUCTION APPARATUS AND METHODS

(71) Applicants: Hamidreza Farmanbar, Ottawa (CA); Navid Tadayon, Kanata (CA); Yicheng Lin, Ottawa (CA)

(72) Inventors: Hamidreza Farmanbar, Ottawa (CA); Navid Tadayon, Kanata (CA); Yicheng Lin, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/556,850

(22) Filed: Aug. 30, 2019

(65) Prior Publication Data

US 2021/0067297 A1 Mar. 4, 2021

(51) Int. Cl.
*H04L 5/00* (2006.01)
*H04B 7/0413* (2017.01)

(52) U.S. Cl.
CPC .......... *H04L 5/0053* (2013.01); *H04B 7/0413* (2013.01)

(58) Field of Classification Search
None
See application file for complete search history.

(56) References Cited

U.S. PATENT DOCUMENTS

| | | | | |
|---|---|---|---|---|
| 9,460,401 | B2* | 10/2016 | Zeng | G06N 20/00 |
| 10,142,070 | B1* | 11/2018 | Zhou | H04L 5/0082 |
| 2006/0146948 | A1* | 7/2006 | Park | H04L 5/0048 |
| | | | | 375/260 |
| 2009/0175370 | A1* | 7/2009 | Kuroda | H04W 72/005 |
| | | | | 375/260 |
| 2012/0076101 | A1* | 3/2012 | Kojima | H04W 72/0453 |
| | | | | 370/329 |
| 2014/0247748 | A1 | 9/2014 | Kang et al. | |
| 2015/0282123 | A1* | 10/2015 | Miao | H04L 5/0051 |
| | | | | 455/450 |
| 2015/0282124 | A1* | 10/2015 | Miao | H04L 5/0051 |
| | | | | 455/450 |
| 2015/0312008 | A1* | 10/2015 | Annavajjala | H04W 24/08 |
| | | | | 370/252 |
| 2015/0319757 | A1* | 11/2015 | Baldemair | H04L 5/0051 |
| | | | | 370/329 |
| 2015/0351063 | A1 | 12/2015 | Charbit et al. | |

(Continued)

FOREIGN PATENT DOCUMENTS

| | | |
|---|---|---|
| CN | 102594516 A | 7/2012 |
| CN | 103220066 A | 7/2013 |

(Continued)

OTHER PUBLICATIONS

Peihao Dong, et al, "Machine Learning Prediction based CSI Acquisition for FDD Massive MIMO Downlink," IEEE Globecom, Dec. 2018, 6 pages.

(Continued)

*Primary Examiner* — Alpus Hsu
*Assistant Examiner* — Camquyen Thai

(57) ABSTRACT

Network equipment receives, from a User Equipment (UE), an indication that the network equipment is to transition to sparse reference signaling for the UE, and the network equipment then transmits the sparse reference signaling to the UE. The sparse reference signaling is consistent with a sparse signaling pattern, which is determined at the UE based on previous reference signaling previously transmitted to the UE or another UE. At a UE, the sparse reference signaling is received from network equipment, and channel measurement and prediction are performed based on the received sparse reference signaling.

28 Claims, 13 Drawing Sheets

(56) References Cited

U.S. PATENT DOCUMENTS

| | | | |
|---|---|---|---|
| 2016/0066209 A1* | 3/2016 | Lin | H04W 28/0231 |
| | | | 370/230 |
| 2016/0105264 A1* | 4/2016 | Chen | H04L 5/0048 |
| | | | 370/329 |
| 2016/0211959 A1* | 7/2016 | Jongren | H04L 5/0048 |
| 2016/0249350 A1* | 8/2016 | Koutsimanis | H04W 72/0446 |
| 2016/0359600 A1 | 12/2016 | Krzymien et al. | |
| 2017/0279579 A1* | 9/2017 | Qian | H04W 72/0406 |
| 2017/0338923 A1* | 11/2017 | Prasad | H04L 5/0023 |
| 2018/0054288 A1* | 2/2018 | Gelabert | H04L 5/0048 |
| 2018/0219662 A1* | 8/2018 | Kim | H04L 5/0051 |
| 2018/0254868 A1* | 9/2018 | Saito | H04L 5/001 |
| 2018/0331872 A1 | 11/2018 | Manolakos et al. | |
| 2019/0123864 A1* | 4/2019 | Zhang | H04B 7/0695 |
| 2019/0305908 A1* | 10/2019 | Lee | H04L 5/0094 |
| 2019/0334749 A1* | 10/2019 | Tang | H04L 5/0053 |
| 2019/0357221 A1* | 11/2019 | Davydov | H04L 5/0064 |
| 2020/0044796 A1 | 2/2020 | Yang et al. | |
| 2020/0343985 A1 | 10/2020 | O'Shea et al. | |

FOREIGN PATENT DOCUMENTS

| | | |
|---|---|---|
| CN | 106716865 A | 5/2017 |
| CN | 107979455 A | 5/2018 |
| CN | 109075851 A | 12/2018 |
| CN | 109167618 A | 1/2019 |
| CN | 109672464 A | 4/2019 |
| CN | 109743269 A | 5/2019 |
| CN | 110603740 A | 12/2019 |
| WO | 2017018969 A1 | 2/2017 |
| WO | 2017107084 A1 | 6/2017 |
| WO | 2018053009 A1 | 3/2018 |
| WO | 2018063042 A1 | 4/2018 |
| WO | 2018127208 A1 | 7/2018 |
| WO | 2020069207 A1 | 4/2020 |

OTHER PUBLICATIONS

Huawei et al, "Discussion on the design of SCMA", 3GPP TSG RAN WG1 Meeting #92bis, R1-1803663, Sanya, China, Apr. 16-20, 2018, total 7 pages.

ZTE, "Discussion on some issues of additional carrier types", 3GPP TSG-RAN WG1 Meeting #67, R1-113754, San Francisco, USA, Nov. 14-18, 2011, total 4 pages.

3GPP TS 36.211 V13.11.0 (Jun. 2019), 3rd Generation Partnership Project; Technical Specification Group Radio Access Network; Evolved Universal Terrestrial Radio Access (E-UTRA); Physical channels and modulation (Release 13), 173 pages.

* cited by examiner

REFERENCE SIGNALING OVERHEAD REDUCTION APPARATUS AND METHODS

FIELD

This application relates to wireless communications, and in particular to reducing reference signaling overhead in wireless communication networks.

BACKGROUND

Signaling overhead in wireless communication networks can be a significant concern, in that such overhead occupies network resources that might otherwise be usable for communications. Pilot overhead for channel estimation and acquisition in massive Multiple Input Multiple Output (MIMO) systems, for example, is a substantial drawback.

Reduction in reference signaling overhead, such as pilot overhead, without significant performance loss in operations such as channel estimation that are based on reference signals, remains a challenge. Signaling overhead reduction might be equivalently seen as providing performance gains relative to existing wireless communication systems given the same signaling overhead.

SUMMARY

Embodiments of the present disclosure are applicable to aspects of User Equipment operation, including Channel State Information (CSI) acquisition and feedback using CSI Reference Signal (CSI-RS) signaling for example, and/or channel estimation using Demodulation Reference Signal (DM-RS) and/or Phase Tracking Reference Signal (PT-RS) signaling for example, for the purpose of data demodulation.

CSI-RS-based acquisition is performed by a User Equipment (UE) through measurement at CSI-RS antenna ports. Channel estimation for the purpose of data demodulation is performed by a UE through measurement at DM-RS and/or PT-RS antenna ports. Embodiments of the present disclosure concentrate primarily on reducing reference signaling overhead associated with CSI-RS, DM-RS and/or PT-RS. Such overhead is an important drawback in Frequency Division Duplex (FDD) Massive MIMO scenarios, for example. Although massive MIMO has high potential for achieving high data rates through sending multiple parallel data streams, reference signaling overhead increases proportionally with the number of data streams. Furthermore, large reference signaling overhead associated with pilot signals, for example, results in pilot contamination where pilots that are transmitted by base stations in different cells overlap on time-frequency resources, which in turn results in poor channel estimation/CSI acquisition performance.

One aspect of this disclosure relates to a method performed by network equipment in a wireless communication network. The method involves receiving, from a UE, an indication that the network equipment is to transition to sparse reference signaling for the UE, and transmitting, to the UE, the sparse reference signaling consistent with a sparse signaling pattern. The sparse signaling pattern is determined based on previous reference signaling previously transmitted to the UE or another UE.

Network equipment for a wireless communication network, according to another embodiment, includes a processor and a processor-readable memory, coupled to the processor, and storing processor-executable instructions which, when executed by the processor, cause the processor to perform a method. The method involves, as noted above, receiving from a UE an indication that the network equipment is to transition to sparse reference signaling for the UE, and transmitting the sparse reference signaling to the UE. The sparse reference signaling is consistent with a sparse signaling pattern determined based on previous reference signaling previously transmitted to the UE or another UE.

A processor-readable memory may be used to store processor-executable instructions which, when executed by a processor in network equipment in a wireless communication network, cause the processor to perform such a method.

Some embodiments relate to a UE. For example, a method performed by a UE in a wireless communication network may involve receiving, from network equipment in the wireless communication network, sparse reference signaling determined based on previous reference signaling previously received by the UE or another UE, and performing channel measurement and prediction based on the received sparse reference signaling.

A UE according to another embodiment includes a processor and a processor-readable memory, coupled to the processor, storing processor-executable instructions which, when executed by the processor, cause the processor to perform a method. The method involves receiving, from network equipment in a wireless communication network, sparse reference signaling determined based on previous reference signaling previously received by the UE or another UE, and performing channel measurement and prediction based on the received sparse reference signaling.

In a further embodiment, a processor-readable memory is used to store processor-executable instructions which, when executed by a processor in network equipment in a wireless communication network, cause the processor to perform such a method.

BRIEF DESCRIPTION OF THE DRAWINGS

Embodiments of the disclosure will now be described with reference to the attached drawings in which.

DETAILED DESCRIPTION

Embodiments of the present disclosure are applicable to any of various types of communications. Consider, for example, an FDD system in which a base station or other network equipment is configured to transmit reference signaling in the form of CSI-RS signaling to a User Equipment (UE), which performs Channel State Information (CSI) acquisition and feedback to the base station based on the CSI-RS signaling. The base station then also performs a CSI acquisition procedure based on the feedback from the UE. According to an embodiment, a CSI-RS configuration that involves sparse CSI-RS signaling is determined by a UE and signaled to the base station, to thereby reduce reference signaling overhead.

Time Division Duplex (TDD) applications are also possible. In a TDD system, network equipment such as a base station transmits reference signaling in the form of DM-RS signaling to a UE, to enable the UE to perform channel estimation. In some embodiments, the UE determines a sparse DM-RS signaling configuration to reduce signaling overhead, and provides to the base station an indication of that signaling configuration, to be applied by the base station.

Partial channel estimation is performed using sparse reference signaling, and channel prediction is performed for any channel elements for which sparse signaling does not include a reference signal. The channel prediction uses the results of partial channel estimation in some embodiments.

In these examples, for FDD applications such as in massive MIMO an objective is to reduce CSI-RS overhead, and for the TDD applications, a goal is to reduce DM-RS overhead. CSI-RS and DM-RS are examples only, and other embodiments may be applied to other types of reference signaling.

Figure 1:
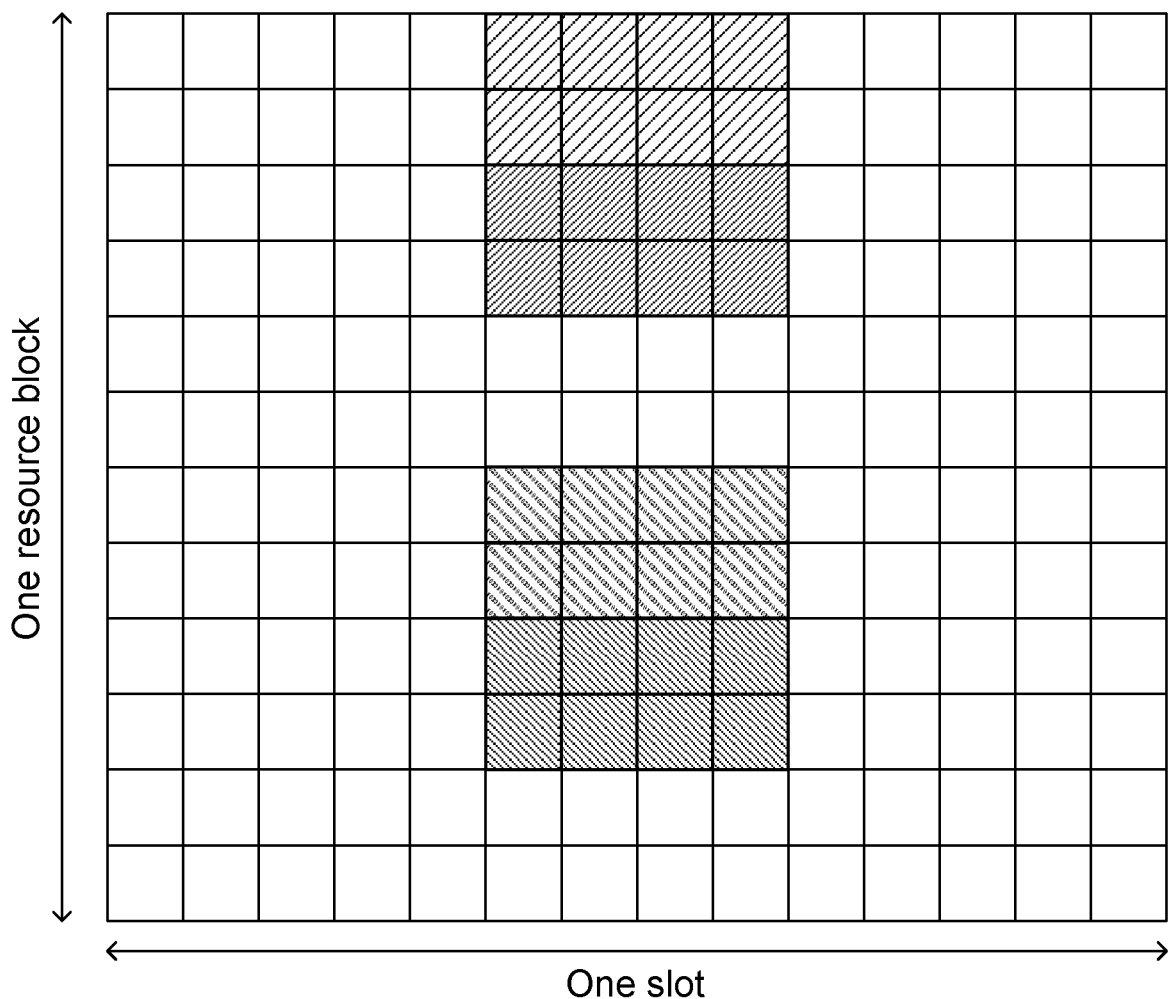
FIG. 1 is a block diagram illustrating a 32-port CSI-RS pattern in a time-frequency grid.
Figure 1:
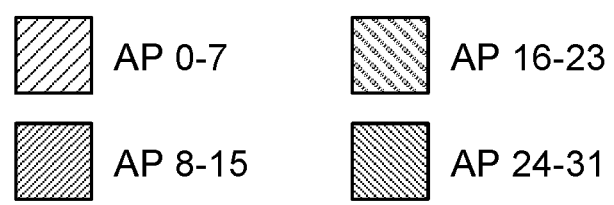

Reference signaling overhead may be reduced by taking advantage of channel correlation in time and frequency. FIG. 1 is a block diagram illustrating a 32-port CSI-RS pattern in a time-frequency grid. This pattern is supported in $5^{th}$ Generation New Radio (5G NR) Release 15, and includes a respective pilot for each antenna port (AP) 0 to 31. The pattern is repeated with configurable periods both in time and frequency, depending on channel correlation in time and frequency.

In addition to correlation in time and frequency, channel correlation across antennas can be utilized to improve performance in such operations as channel acquisition and/or channel estimation. In general, there is correlation across channel coefficients corresponding to different transmit antenna elements from a transmitter. In other words, for a number M of transmit antenna elements, coefficients ($h_1$, $h_2$, . . . , $h_M$) are statistically correlated. Although such correlation is low in a rich scattering propagation environment, the correlation across antennas can be quite significant in a poor scattering environment, with strong Line of Sight (LOS) components and relatively few Non Line of Sight (NLOS) components, for example. If the number of channel parameters (path amplitudes, path delays, Angles of Arrival (AoAs)/Angles of Departure (AoDs)), are smaller than the number of antennas, then generally the channel corresponding to a subset of transmit antennas can be reproduced from the channel corresponding to the rest of the transmit antennas.

See, for example, P. Dong, H. Zhang, and G. Y. Li, "Machine learning prediction based CSI acquisition for FDD massive MIMO downlink," *IEEE GLOBECOM*, December 2018. Using channel correlation across antennas, estimated channels at a subset of antennas are used to predict the channels at other antennas. If the number of channel parameters is significantly less than the number of transmit antennas, then one can construct the channel for antennas without pilots given a sparse pilot pattern. However, this technique is based on transmitting pilots on only a fixed subset of transmit antennas that does not cover all of the transmit antennas. Therefore, as channel conditions move toward a rich scattered environment, channel prediction error for antennas without a pilot can increase dramatically, resulting in unbalanced estimation error on different CSI-RS ports. This technique is also based on narrowband transmission as opposed to wideband transmission, such as Orthogonal Frequency Division Multiplex (OFDM) transmission. Online training to determine channel correlations during communications with UEs is also not supported. Furthermore, determination of the antenna subsets is at a base station rather than at a UE, as disclosed herein.

Embodiments disclosed herein provide a novel method to jointly utilize channel correlations in space/time/frequency to reduce reference signaling overhead such as pilot overhead. Reduced density or sparse reference signaling configurations allow balanced pilot densities across different antenna ports in some embodiments. In other embodiments, different antenna ports have different densities of reference signaling in a sparse signaling configuration.

Signaling from a UE to a base station or other network equipment is introduced in some embodiments. Such signaling may be used to indicate completion of training, for example. UE to network equipment signaling may also or instead be used to indicate a need for re-training, to support adjustment of reference signaling configuration to lower or higher densities.

Support for online training, in addition to or even instead of offline training, is provided in some embodiments. In offline training, taking an FDD application as an example, a geographic area is surveyed by a UE and channels at CSI-RS antenna ports are measured, possibly at different locations and/or with different base stations within the area. Although dense signaling during training may generally be preferred for expected better performance, it may be possible to train as long as channel measurements include some elements in both input and output data sets. Once sufficient channel measurements are collected, one or more predictors can be developed, by training a Machine Learning (ML) module for example, based on one or more sparse pilot patterns. The UE provides an indication of a pilot pattern to a base station, the base station then uses that pilot pattern, and the UE uses the predictor for predicting one or more elements of a channel. In online training, again taking an FDD application as an example, a UE collects channel measurements according to transmitted downlink CSI-RS signaling by network equipment while the UE is performing normal data demodulation/CSI feedback. As in offline training, once sufficient channel measurements are collected, one or more predictors can be developed based on one or more pilot patterns, the UE provides an indication of a pilot pattern to a base station, the base station then uses that pilot pattern, and the UE uses the predictor for predicting one or more elements of a channel.

In some embodiments, the network equipment configures the UE with one or more parameters to enable the UE to perform channel estimation based on sparse reference signaling. BS and UE are thereby aligned in terms of configuration. UE configuration is within jurisdiction of the network. In some embodiments, a UE indicates to network equipment multiple sparse pilot patterns that the UE has determined are suitable for the UE to use. The network equipment can then select one pattern and configure the UE for that pattern.

Online training may be generally preferred, to avoid taking network equipment offline during training. Online training may also be more suitable than offline training to support per-UE training and/or predictors, because UEs that are involved in training are perhaps more likely to also be actively communicating with network equipment after training has been completed.

ML is an emerging and fast-growing field, as a result of advances in computer architecture such as General Purpose Graphics Processing Units (GP-GPUs). As an example, deep Convolutional Neural Networks have attracted attention because of their ability to find patterns in data with intrinsic structure through the use of convolutional filters. The application of ML to the field of communications is largely unexplored and may help outperform existing solutions and/or help reshape wireless networks conceptually. ML modules as referenced herein are intended to be components or blocks based on an implementation of ML mechanisms. One example of an ML implementation is a neural network implemented in hardware, one or more components that execute software, or a combination thereof.

It should be appreciated that ML is used in some embodiments for channel prediction based on sparse reference signaling. Although ML may be quite useful and efficient in predicting channel coefficients and/or other parameters for "non-pilot" channels or positions based on sparse reference signaling, for example, ML represents only one possible type of implementation. Non-ML embodiments are also possible.

As noted elsewhere herein, pilot overhead in FDD massive MIMO is a significant drawback. Embodiments disclosed herein are targeted toward reducing pilot overhead without significant performance loss in reference signal-based operations such as channel estimation. Equivalently, embodiments may provide performance gains relative to existing techniques given the same pilot overhead.

The present disclosure introduces techniques for UEs to learn or otherwise determine dependencies across channel coefficients in space (antenna/antenna port), time, and frequency. Such dependencies can then be used to determine sparse reference signaling patterns, with lower density pilot configurations to reduce pilot overhead for example. A UE provides an indication of a sparse reference signaling pattern to network equipment, and that signaling pattern is subsequently used by the network equipment to reduce reference signaling overhead.

Embodiments disclosed herein include example embodiments for CSI-RS pilot overhead reduction, in FDD massive MIMO for example, and for DM-RS and/or PT-RS pilot overhead reduction, in TDD massive MIMO for example.

These embodiments take advantage of channel dependencies across space, time, and frequency in order to reduce reference signaling overhead.

Figure 2:
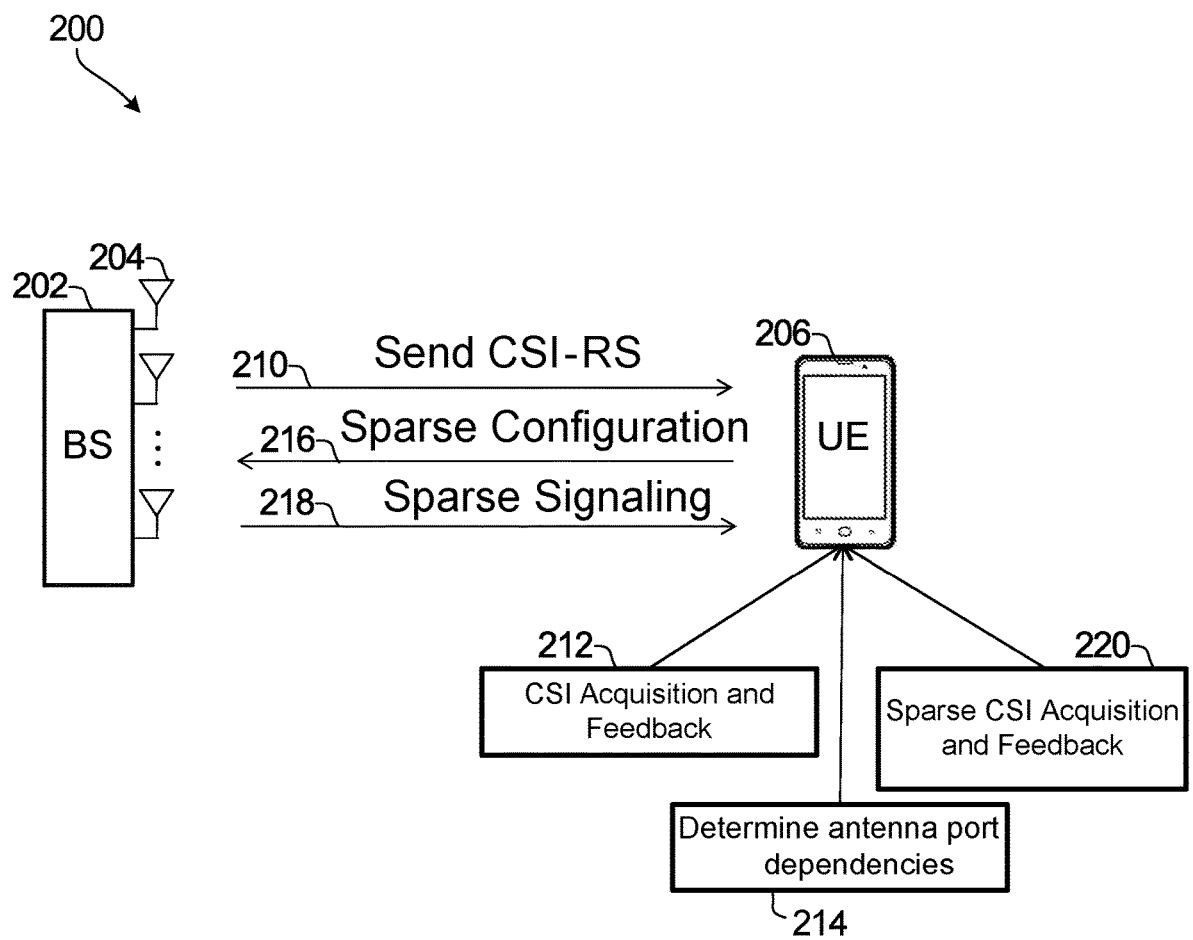
FIG. 2 is a block diagram illustrating a base station (BS) and a UE, and examples of operations that may be performed in some embodiments.

FIG. 2 is a block diagram 200 illustrating a base station (BS) 202 with multiple antenna elements 204, and a UE 206. Each antenna element 204 can be associated with an antenna port for example. However, an antenna port is a logical construct, and in general may have one or more than one associated antenna element 204. In an embodiment, an antenna port is defined such that the channel over which a symbol on the antenna port is conveyed can be inferred from the channel over which another symbol on the same antenna port is conveyed. An antenna port may also be referred to as a virtual antenna port or logical antenna port.

Reference signals or pilots such as CSI-RS and DM-RS may be beamformed, using analog beamforming and/or digital beamforming. Antenna ports may therefore be physical antenna ports, or virtual antenna ports that are in effect generated after beamforming.

Virtual antenna ports may also or instead correspond to MIMO layers. Accordingly, antenna ports may include virtual antenna ports that correspond to MIMO layers and/or to beams. The number of virtual antenna ports can be less than the number of physical antenna ports.

It should therefore be appreciated that the teachings herein may be applied to embodiments that support such features as beamforming and/or virtual antenna ports. For example, sparse pilot pattern density may be defined, specified, or considered in terms of pilot or signaling density per (virtual) antenna port, per MIMO layer, and/or per beam.

More detailed examples of a BS and a UE are provided elsewhere herein. Operations that may be performed in some embodiments for CSI-RS overhead reduction in FDD massive MIMO, for example, are shown at 210, 212, 214, 216, 218.

During a training phase in which the UE 206 is determining appropriate sparse reference signaling that can be used to reduce overhead without significantly impacting performance in respect of determining channel coefficients or parameters, at 210 the BS transmits CSI-RS signaling, which may be full density signaling in some embodiments, to the UE. Full density signaling is also referred to herein as dense signaling, which is intended to indicate reference signaling in which all reference signal locations or positions are populated with a reference signal such as a pilot. With reference to FIG. 1, for example, there are no pilot positions or locations that are not populated or in which a pilot signal is not transmitted. This is an example of dense reference signaling.

CSI acquisition and feedback by the UE 206 are illustrated at 212. The UE 206 transmits to the BS 202 CSI feedback corresponding to the CSI-RS transmit antenna ports through which CSI-RS signaling was transmitted by the BS. 210, 212 are repeated in some embodiments, for different channel realizations due to UE movement for example, until sufficient UE channel estimates are collected by the UE 206.

214 in FIG. 2 represents determination, by the UE 206, of channel dependencies across antenna ports/time/frequency based on the channel measurements collected at 214 corresponding to pilot positions. ML is used to implement 214 in some embodiments. This is described in more detail by way of example elsewhere herein.

Based on the antenna port dependencies in the embodiment shown, the UE 206 optimizes a sparse reference signaling pattern and corresponding predictor that is to be used for the UE 206, and/or potentially other UEs as well as or instead of the UE 206. A sparse reference signaling pattern that is determined or otherwise obtained by a UE based on collected channel measurements need not necessarily be subsequently used only for that UE. For example, the same sparse reference signaling pattern is used for all UEs at or near the location(s) at which channel measurements were previously collected for determining or obtaining the sparse reference signaling pattern. An indication of the sparse reference signaling pattern is transmitted from the UE 206 to the BS 202 at 216. One or more of overall reference signaling density, reference signaling densities per antenna port or subset of antenna ports, and CSI-RS pattern index or identifier, for example, may be transmitted from a UE to the BS 202 at 216 to inform the BS that a sparse reference signaling pattern has been determined and is to be applied.

Sparse reference signaling consistent with the pattern is then transmitted by the BS 202 at 218, to the same UE 206 and/or potentially another UE, and the UE performs CSI acquisition and feedback at 220. This is similar to 210, 212 as discussed above, but involves sparse CSI-RS signaling that includes only a subset of the CSI-RSs from the more dense CSI-RS signaling at 210. For CSI acquisition and feedback 220, the UE 206 estimates the channel at pilot positions in the sparse reference signaling, predicts the channel at non-pilot positions, and uses the channel estimates along with the channel predictions to derive CSI such as proper CSI, such as Channel Quality Indicator (CQI), Rank Indicator (RI), and Precoding Matrix Indicator (PMI), for transmission to the BS 202.

In some embodiments, the BS 202 configures the UE 206 for lower density reference signaling before 218. This may be useful at least in a scenario in which a sparse reference signaling pattern that was determined or otherwise obtained by one UE is to be used by a base station for a different UE. The different UE can then receive from the base station any information that the UE needs to perform CSI acquisition and feedback based on the sparse reference signaling.

Figure 3:
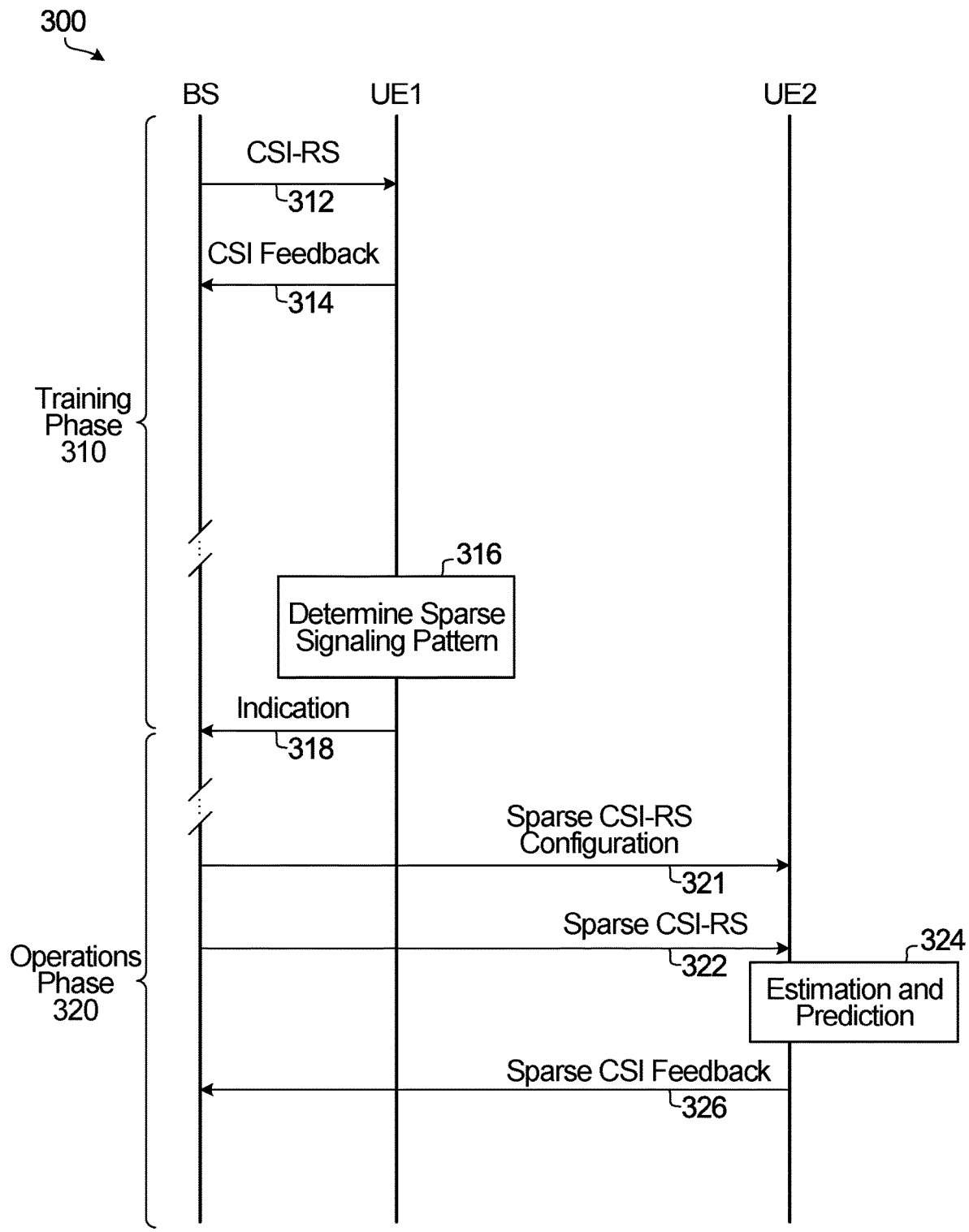
FIG. 3 is a signal flow diagram illustrating BS-UE signaling according to another embodiment.

FIG. 3 is a signal flow diagram illustrating BS-UE signaling according to another embodiment. In the signal flow diagram 300, a BS and a UE, labeled as UE1, are involved in a training phase 310. Although only one UE is involved in the training phase 310 shown by way of example in FIG. 3, in other embodiments multiple UEs may be in a training phase with the BS and/or other BSs.

A CSI-RS/CSI feedback signaling exchange between the BS and UE1 is shown at 312, 314. This exchange is similar to the CSI-RS transmission at 210 in FIG. 2 and corresponding feedback described above. The BS transmits (possibly dense) CSI-RS signaling at 312 and receives corresponding CSI feedback from UE1 at 314. Although only one CSI-RS/CSI feedback exchange is shown at 312, 314 in FIG. 3, there may be multiple exchanges between the BS and UE1, as UE1 moves between multiple locations during a training phase for example.

In some embodiments, UE1 provides an indication of current UE location corresponding to the CSI feedback, or the BS otherwise determines the UE location. UE location information may be useful in embodiments in which training is not necessarily UE-specific, in which case training that is based on feedback from a certain UE is also used for communications with one or more other UEs. For example, the BS may associate UE location information with a sparse reference signaling configuration for UE1 at one UE location, and then use the same sparse reference signaling configuration for other UEs at or near that same UE location.

UE location need not be used only in embodiments in which training is not UE-specific. A UE may also track its own location and record in memory information associated with sparse reference signaling pattern and/or predictors for use the next time the UE is at or near one of its own previous locations. UE location may also or instead be tracked in embodiments with UE-specific training, to enable a BS and/or a UE to determine when the UE has moved by an amount that may impact channel conditions. Responsive to detection of such movement, the BS and/or the UE may initiate a new training phase or re-training phase for the new UE location.

Generation of the CSI by UE1 for feedback at 314 provides data samples that are collected by UE1. The collected data samples are used by UE1 at 316 to determine a sparse reference signaling pattern, by training one or more ML modules for example. Data sample collection need not be entirely completed before pattern determination begins at 316. For example, data samples could be used for ML module training as those data samples are collected. In some embodiments, UE1 transmits an indication to the BS at 318 to signal the end of training and/or to provide the BS with an indication of the sparse reference signaling pattern that is to be used for UE1 and/or potentially one or more other UEs.

In the operations phase 320, the sparse reference signaling pattern that is determined at 316 is used in CSI-RS signaling with UE2. In this example, training is not UE-specific. The training with UE1 during the training phase is applied to one or more other UEs, in this case UE2, and the UE is configured for the sparse CSI-RS configuration at 321. Information that UE2 needs to perform channel prediction for non-pilot channels, for example, is transmitted to UE2 by the BS. In other embodiments, the BS uses a sparse reference signaling configuration only for the UE(s) that determined or otherwise obtained the sparse reference signaling pattern, and further configuration of a UE by the BS may or may not be performed at 321.

UE configuration may be performed even for a UE that determined a sparse signaling configuration at 316. For example, transmitting CSI-RS signaling may involve CSI-RS configuration of a UE, by Radio Resource Control (RRC) signaling for example, and sending CSI-RS signaling. Such CSI-RS configuration may be used to provide a UE with such information as the location(s) of CSI-RS within a time-frequency grid and antenna port mappings. Actually sending the CSI-RS signaling enables the UE to estimate a channel at transmitted CSI-RS locations.

Channel characteristics may vary depending on UE location, and therefore the particular sparse reference signaling pattern that is used at 322 may be UE location-dependent. Although not shown in FIG. 3, the BS may determine the location of UE2, based on a UE location indication provided to the BS by UE2 or in some other way, and obtain a sparse reference signaling configuration for the current location of UE2. The BS may select from multiple sparse reference signaling configurations based on current UE location, for example.

At 324, UE2 performs CSI estimation and prediction, and CSI feedback is transmitted to the BS by UE2 at 326. The CSI feedback is labeled as sparse CSI feedback in FIG. 3, to indicate that the CSI feedback is based on sparse reference signaling.

UE behaviors during the training phase 310 in FIG. 3 include receiving dense CSI-RS signaling at 312, transmitting CSI feedback at 314, determining a sparse signalling pattern at 316, and transmitting an indication to the BS at 318. During the operations phase 320, UE2 receives configuration information from the BS at 321, receives sparse CSI-RS signaling from the BS at 322, performs estimation and prediction at 324, and transmits CSI feedback to the BS at 326. UE2 may also transmit an indication of its location to the BS before 322, and may receive configuration information at 321.

BS behaviors during the training phase 310 in FIG. 3 include transmitting (possibly dense) CSI-RS signaling at 312, receiving (possibly dense) CSI feedback at 314, and receiving the indication at 318. Other BS behaviors, during the operations phase 320, include optionally transmitting sparse CSI-RS configuration information at 321, transmitting sparse CSI-RS signaling at 322, and receiving sparse CSI feedback at 326. A BS may also receive UE location information or otherwise determine UE location in some embodiments.

Embodiments consistent with FIG. 2, FIG. 3, and/or other teachings herein, may be implemented in any of various ways. For example, a neural network may be trained with UE data samples, such that the neural network learns antenna port dependencies and can be used to determine sparse reference signaling patterns and/or channel predictors. This type of ML application enables sparse reference signaling patterns, and/or channel predictors to be obtained and/or optimized during training, and subsequently used for partial channel estimation with sparse reference signaling and partial channel prediction rather than dense reference signaling each time channel parameters are to be determined.

Although FIG. 3 illustrates an embodiment that employs a two-phase procedure with a training phase 310 and an operations phase 320, this is not intended to imply that the training phase is necessarily offline. Offline training is only one possible embodiment. Data samples for training may also or instead be collected during live communications. The CSI-RS signaling at 312 may be part of normal communications between the BS and UE1, and the BS may transition to sparse CSI-RS signaling for UE1 and/or UE2 after sufficient data samples have been collected during online training.

In some embodiments, UE locations are specified using ordered sets of values according to a coordinate system, such as (x,y) or (x,y,z). There are ways to reduce UE location signaling overhead. For example, UE location information signaled to a BS can be of an incremental value instead of absolute value. UE location is expected to change continuously, rather than discontinuously with significant changes between locations, at least while a UE is actively in use. An example of an incremental value for signaling UE location is a quantized offset indicating a new UE location relative to a previous location. Distance from a previous location could be signaled, for example, as n*D units distance from the previous location, where n is the number of quantized distance units, and D is the quantized direction, such as East, West, North, or South. Multiple increments could be signaled, for example if the UE moves Northwest from its previous location. Sending one or more quantized incremental values may reduce location information overhead compared to sending absolute location information every time a UE is moved.

Similarly, sparse reference signaling configurations may be specified in any of various ways. For example, pilot and/or non-pilot antenna port indices for a signaling pattern may be specified in a signaling configuration. Time-frequency grid locations corresponding to pilot and/or non-pilot positions in a signaling pattern may also or instead be specified in a signaling configuration. An ordered pair represents one example of a data element that may be used to specify a location in a two-dimensional grid. A series of ones and zeros could be used to indicate pilot locations for which pilots are (e.g., a "one") and are not (e.g., a "zero") to be transmitted. A pattern for a 32-antenna port embodiment with one pilot location per antenna port, for example, may be specified in a 32-bit binary sequence.

In some embodiments, the locations of base or dense antenna ports in a time-frequency grid are known, and a subset of these locations is signaled using a bitmap, such as a 32-bit binary sequence in the above example. The subset constitutes the sparse pattern. Given a known base pattern, such as a regular, possibly dense pattern, a difference between the base pattern and the sparse pattern may be signaled, through a bitmap sequence or otherwise, instead of signaling the sparse pattern itself. Per-antenna port configuration may be supported, by enabling any individual AP to be designated as pilot or non-pilot. Such pattern differences can be signalled, semi-statically in some embodiments, through RRC signaling for example, or dynamically, through a control channel in dynamic Downlink Control Information (DCI) for example.

These examples relate to defining or specifying a reference signaling pattern. In some embodiments patterns themselves are indexed or otherwise specified such that details of each pattern can be accessed, determined, or otherwise obtained from a pattern index or other identifier. A pattern index or identifier could be used as a key or lookup in a pattern list or table, stored in memory, to determine exactly where, in a pattern, reference signaling such as pilots should be transmitted. A lookup is just one example of how a pattern index or identifier could be used. Another example is a pattern index or identifier of value "x" specifying the $x^{th}$ pattern in a list or sequence of patterns. Yet another example is a pattern index or identifier corresponding to a binary representation of on-off pilot locations, such as a decimal value pattern index for which a corresponding binary value specifies on and off pilot locations in a pattern.

Pattern indices or identifiers may be particularly useful in embodiments that involves multiple patterns. For example, variable or varying reference signaling may involve hopping or switching between multiple patterns. A signaling configuration may specify a series of pattern indices or identifiers, to thereby define a hopping or switching sequence for a variable or varying signaling pattern. Hopping or switching may also or instead be specified in other ways, such as in terms of a starting location or offset in a sequence of patterns and a step size indicating a sequence location, relative to a current location, of a next pattern that is to be used at a next hopping or switching time or event such as a next resource block and/or a next time slot for example.

A signaling configuration or pattern may be associated, by pattern index for example, with corresponding CSI measurement results or estimates and/or with antenna port, by antenna port index for example. Such associations may be implicit or explicit, and may be useful in identifying or otherwise obtaining an appropriate predictor for partial channel prediction.

Other configuration options may also be or become apparent. Regardless of the particular type of configuration that is used, configuration information may be stored in memory, included in control signaling such as RRC signaling, or both stored in memory and included in control signaling. Configuration information could be transmitted in signaling from a UE to a BS, at 318 for example, and/or from a BS to a UE, at 321 for example.

The present disclosure is not limited to any particular form of UE location information or configuration information.

The number of data samples collected and used to determine sparse reference signaling patterns may be statically or dynamically configured at a UE. Another option for ML embodiments involves monitoring an ML module for convergence, and transitioning from a training phase to an operations phase, or transitioning from relatively more dense reference signaling to sparse reference signaling, when a target degree of convergence is reached. Any of various types of cost functions, and/or other convergence testing techniques, may be applied to determine convergence.

Regardless of the specific measure or technique that is used to assess convergence and declare the end of online or offline training, after training is complete, one or more sparse reference signaling patterns are used by the BS to reduce reference signaling overhead relative to a more dense reference signaling.

Due to communication environment changes possibly affecting LOS and/or NLOS (reflection or diffraction) paths or links for example, training is repeated in some embodiments. Training can be considered semi-static in such embodiments. Re-training may be online or offline.

FIGS. 2 and 3 generally introduce sparse reference signaling and configurations. Detailed examples are provided below.

Simply for the purpose of illustration, consider an example of learning antenna port dependencies using ML in the context of two dimensions, namely space (transmit antenna port index) and frequency (subcarrier index), and an FDD application with CSI-RS and CSI feedback signaling. Other embodiments may be applied to different and/or more dimensions. For example, spatial correlation may be exploited along with correlations in time and frequency. In some embodiments a channel can be considered in the context of a four-dimensional grid of transmit antenna port index, receive antenna port index, subcarrier index, and OFDM symbol index.

During training, a BS transmits (possibly dense) CSI-RS signaling to a UE so that the UE can estimate the channel at CSI-RS positions (antenna port index, subcarrier index in this example) and feed back CSI to the BS. This process may continue for different channel realizations, through UE movement for example, until sufficient UE channel estimates are collected by the UE. A non-dense (sparse) reference signaling pattern, which may be defined in RRC configuration or other configuration signaling for example, includes a set of points with a pilot or other reference signal ($A_p$) and a set of points without a pilot or other reference signal ($A_{np}$). For ease of reference, this example refers to pilots. However, the techniques disclosed with reference to pilots may also or instead be applied to other types of reference signaling.

In one ML embodiment, channel coefficients corresponding to $A_p$ serve as inputs and channel coefficients corresponding to $A_{np}$ are labels or outputs of an ML module. The UE evaluates a number of (sparse) CSI-RS patterns and selects the best one(s) for subsequent CSI-RS transmissions in some embodiments. A UE may also or instead indicate several suitable patterns or configuration to network equipment and the choice of pattern or configuration is made by the network equipment.

Figure 4:
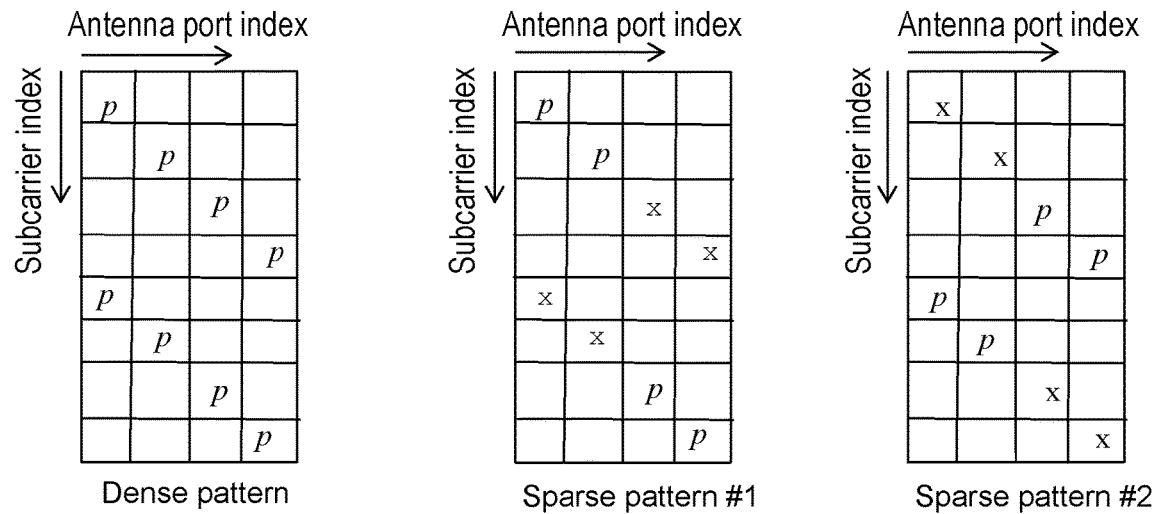
FIG. 4 includes two-dimensional plots of a dense pilot signal pattern and two example sparse patterns #1 and #2.

FIG. 4 includes two-dimensional plots of a dense pilot signal pattern and two example sparse patterns #1 and #2. In FIG. 4, grid points with pilot are labeled "p" and grid points without pilot are labeled "x". The sparse patterns #1 and #2 in FIG. 4 are examples only; other sparse patterns are possible, and further examples are provided elsewhere herein.

In the example shown, the dense pattern includes 2 pilots per antenna port, whereas the sparse patterns #1 and #2 include only one pilot per antenna port. Although all antenna ports still have a pilot in each of the sparse patterns #1 and #2, these patterns are still sparse patterns because they do not include all pilots of the dense pattern. Put another way, the sparse patterns #1 and #2 are half-density relative to the dense pattern in that each antenna port has only one pilot instead of the two pilots in the dense pattern. Pilot density in this example is ½, because there is one pilot in each sparse pattern per two pilots in the dense pattern. More generally, sparse reference signaling has density of less than one relative to dense reference signaling.

Figure 5:
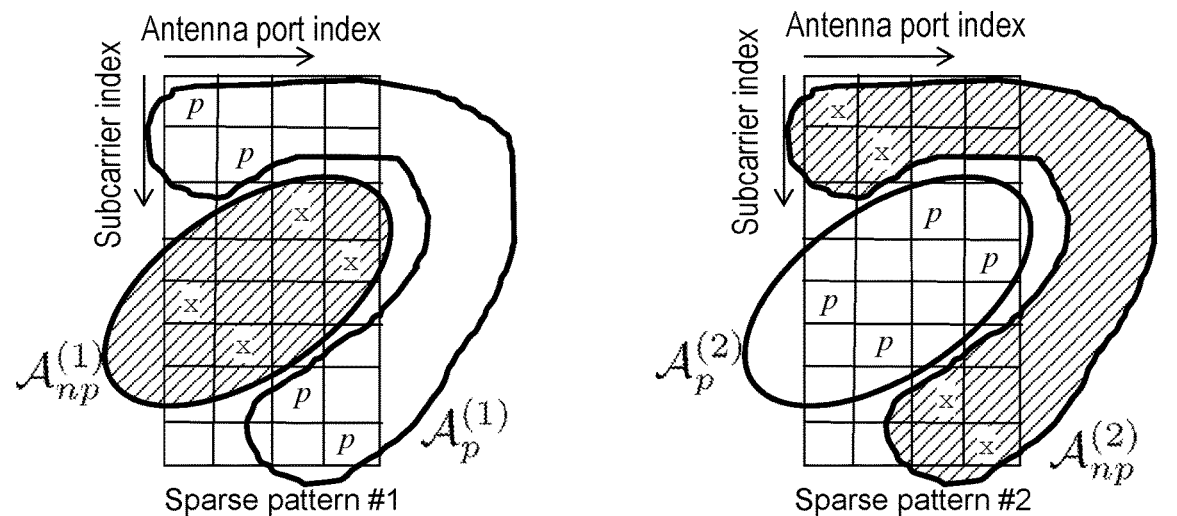
FIG. 5 illustrates examples of ML module training according to two embodiments.
Figure 5:
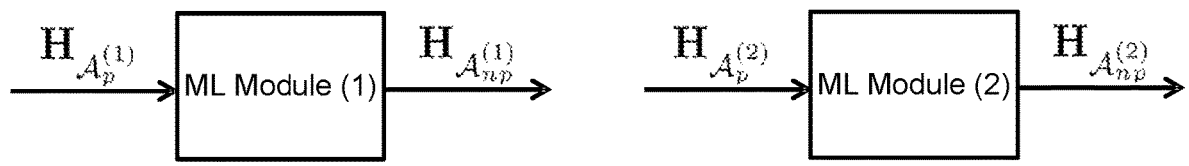

In an embodiment, a UE trains one ML module for each of multiple sparse CSI-RS configurations. FIG. 5 illustrates examples of ML module training according to two embodiments, based on the sparse patterns #1 and #2 in FIG. 4. The channel coefficients corresponding to $A_p$ ($H_{Ap}$) serve as inputs and the channel coefficients corresponding to $A_{np}$ ($H_{Anp}$) serve as outputs of each ML module. In FIG. 5, example (1) is shown for sparse pattern #1, and example (2) is shown for sparse pattern #2.

Selection of a sparse reference signaling pattern may be based on any of various factors. In an embodiment, a sparse pattern that provides better performance than others, based on a metric such as Mean Square Error (MSE) observed for test data using each of a number of candidate pattern for example, is selected to reduce reference signaling overhead.

After a sparse reference signaling pattern has been selected or otherwise obtained by a UE, the UE transmits an indication of the sparse signaling pattern to the BS, and the BS transmits CSI-RS signaling that is consistent with that pattern to a UE. As noted elsewhere herein, this includes configuring the UE for the sparse signaling in some embodiments. The UE estimates channels corresponding to the $A_p$ grid points with CSI-RS from the received signal, predicts channels corresponding to the $A_{np}$ grid points, and feeds back CSI to the BS.

Figure 6:
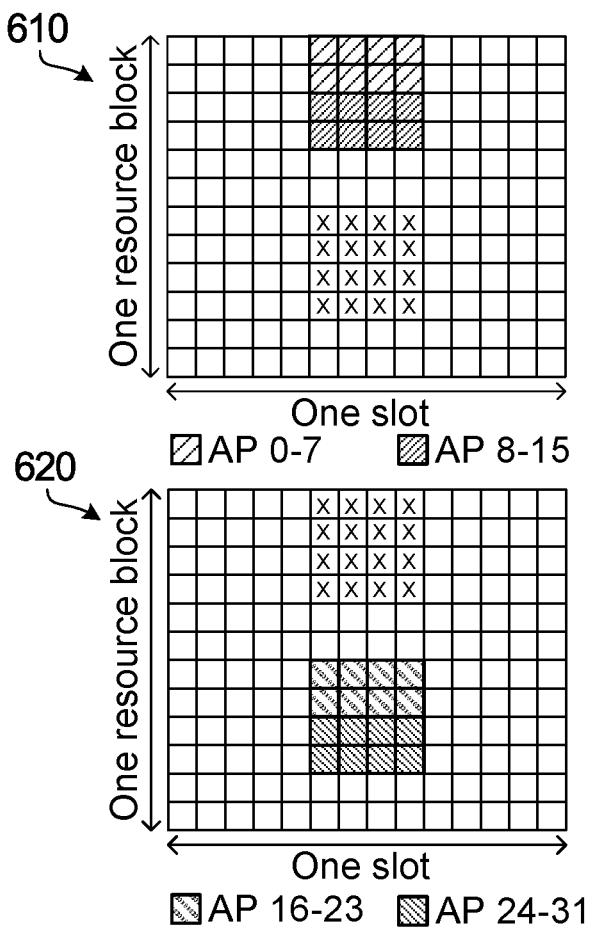
FIG. 6 is a block diagram illustrating, in a time-frequency grid, an example of a varying sparse reference signaling pattern that includes multiple sparse patterns across Resource Blocks (RBs) within a time slot.
Figure 7:
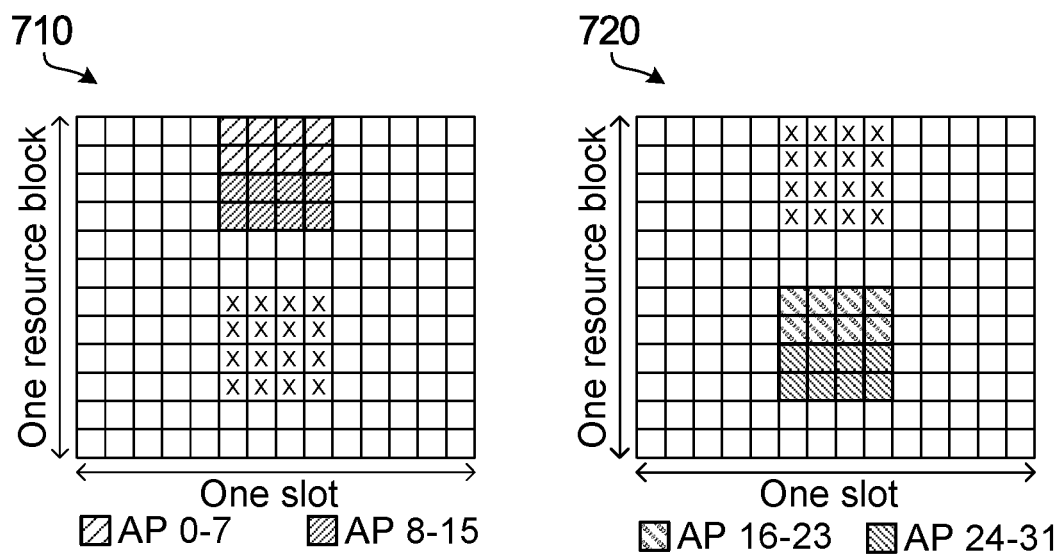
FIG. 7 is a block diagram illustrating, in a time-frequency grid, another example of a varying sparse reference signaling pattern that includes multiple sparse patterns across multiple time slots.
Figure 8:
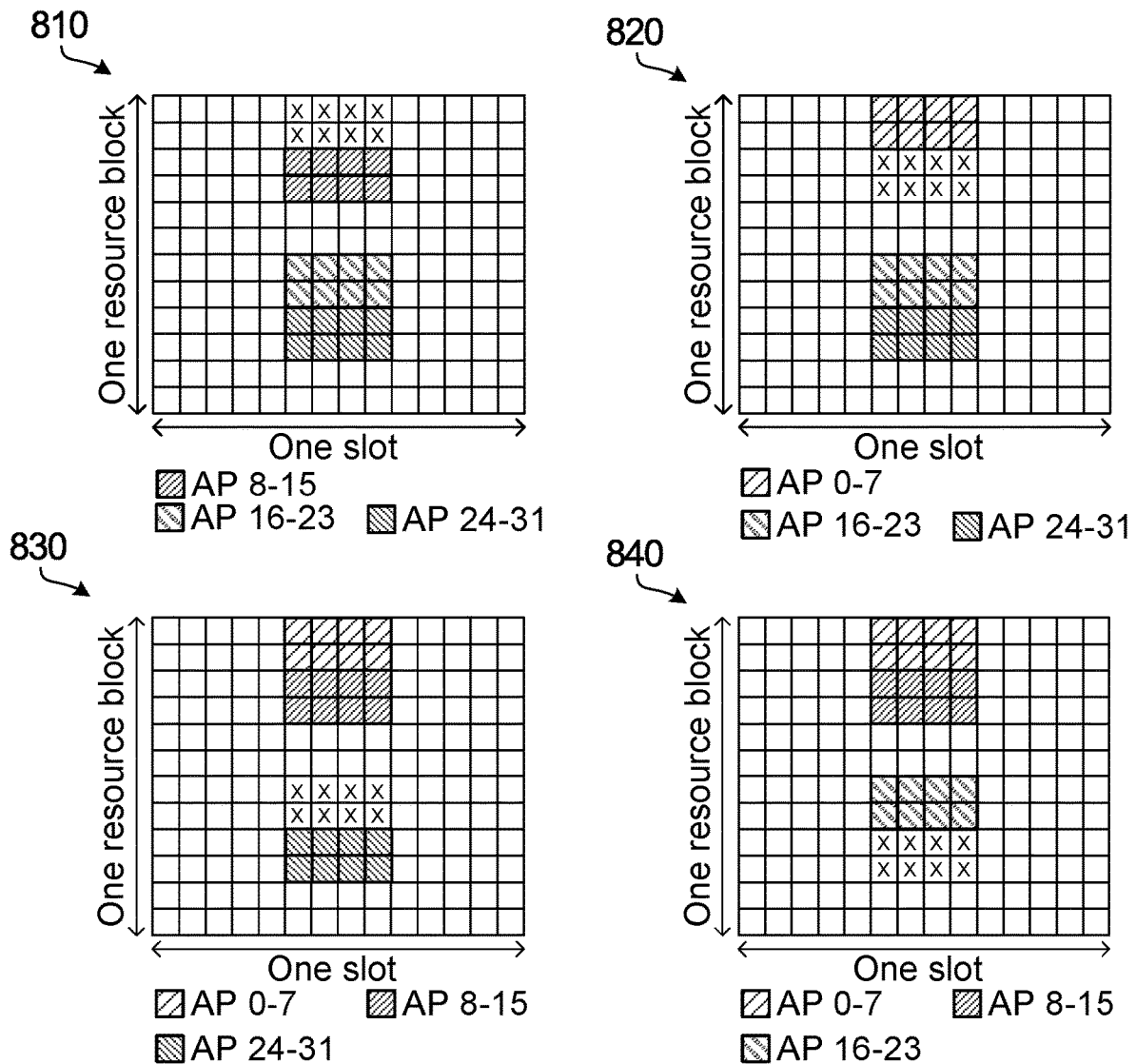
FIG. 8 is a block diagram illustrating, in a time-frequency grid, an example of a varying sparse reference signaling pattern that includes multiple sparse patterns across both RBs and time slots.
Figure 9:
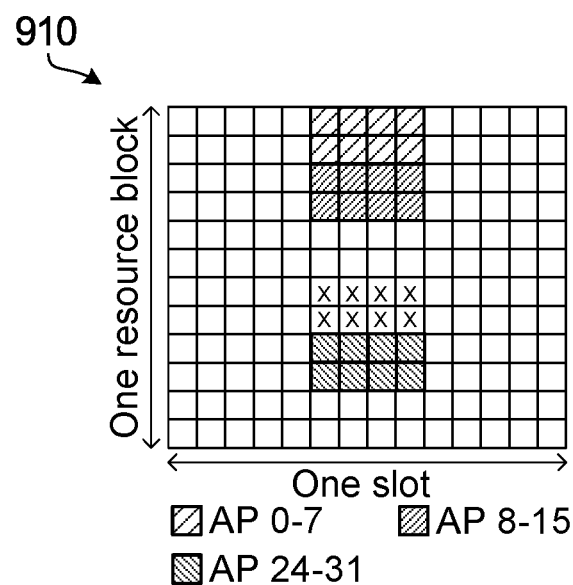
FIG. 9 is a block diagram illustrating, in a time-frequency grid, an example of a varying sparse reference signaling pattern that includes multiple sparse patterns and provides unequal reference signal densities.
Figure 9:
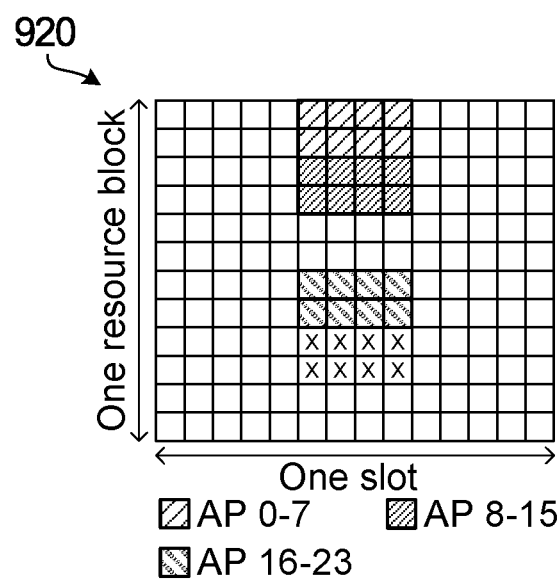

FIG. 6 is a block diagram illustrating, in a time-frequency grid, an example of a varying sparse reference signaling pattern that includes multiple sparse patterns 610, 620. The example shown in FIG. 6, and other examples in FIGS. 7-9, are for a 32-port CSI-RS pattern and an RB that includes fourteen OFDM symbols. OFDM may be useful to provide an additional pilot dimension. Without OFDM, there is only the "antenna" dimension, and pilots can be sent on a subset of antennas to estimate the channel for those antennas and then predict the channel on antennas without pilots. This will result in unbalanced channel estimation error on different antennas because the channel estimation error is higher for the antennas without pilots. According to an aspect of the present disclosure, however, an additional dimension, provided by OFDM in some embodiments, supports one or more pilots for all antenna ports while reducing pilot density.

In comparison with the dense pattern shown in FIG. 1, the example in FIG. 6 is consistent with a half density configuration in which pilots are transmitted on all antenna ports. This half density configuration is provided by introducing a hopping pattern across multiple resource blocks (RBs) within a same time slot. According to a dense signaling configuration, the pattern in FIG. 1 is transmitted every few RBs. In FIG. 6, only half of the pilots from a dense pattern are transmitted.

In the block diagram shown in FIG. 7, the example varying sparse reference signaling pattern includes multiple sparse patterns 710, 720, but across multiple time slots. The example in FIG. 7, like the example in FIG. 6, is consistent with a half density configuration relative to the dense pattern in FIG. 1, due to a hopping pattern across multiple time slots. A dense signaling configuration involves transmitting the pattern in FIG. 1 at certain intervals such as every few time slots, whereas in FIG. 7 only half of the pilots from a dense pattern are transmitted.

Turning to FIG. 8, a hopping pattern is introduced to hop or switch between the multiple sparse patterns 810, 820, 830, 840 across both RBs and time slots. Relative to a dense signaling configuration consistent with FIG. 1, the example shown in FIG. 8 has ¾ density.

The examples in FIGS. 6 to 8 provide overall pilot density of ½ or ¾, and each antenna port has equal pilot density. The block diagram in FIG. 9 illustrates an example of a varying sparse reference signaling pattern that includes multiple sparse patterns 910, 920 and provides unequal reference signaling densities between some of the antenna ports. In the example shown, APs 0-15 have full density and APs 16-31 have ½ density. Overall density of the varying sparse reference signaling pattern in FIG. 9 is ¾ relative to the dense pattern shown in FIG. 1 and a dense signaling configuration.

Although a hopping pattern across RBs in one time slot is illustrated in FIG. 9, other hopping patterns such as the examples shown in FIGS. 6 to 8 may be applied to unequal pilot density embodiments.

Other embodiments are also possible. In general, sparse reference signaling patterns may provide the same or different reference signaling densities for different antenna ports. In embodiments that involve switching between patterns, such as hopping referenced above in the description of FIGS. 6 to 9, pattern switching may be across or between any one or more of: RBs, time slots, and/or one or more other signaling characteristics or dimensions.

It should also be appreciated that the base 32-port CSI-RS discussed herein is just an example. Embodiments of the present disclosure are applicable to any other CSI-RS pattern, or more generally to other reference signal patterns. Additionally, embodiments that provide different signaling densities for different APs are not in any way restricted to the particular example in FIG. 9. The sparse signaling pattern shown in FIG. 9 is an example of a scenario in which APs 0-15 have density 1 and APs 16-31 have density 0.5. Other patterns with non-equal densities are also possible.

In FDD applications, embodiments disclosed herein may be useful in reducing CSI-RS overhead, or equivalently, increasing channel estimation or prediction performance given the same pilot overhead. Introduction of sparse RS configurations may also or instead help mitigate pilot contamination in FDD massive MIMO, for example.

TDD applications for DM-RS and/or PT-RS overhead reduction, in TDD massive MIMO for example, are also contemplated. This is discussed in further detail by way of example with reference to FIG. 10, which is a block diagram 1000 illustrating a BS 1002 with multiple antenna elements 1004, and a UE 1006. Each antenna element 1004 may be associated with an antenna port for example; alternatively, more than one antenna element may be associated with an antenna port. As noted above with reference to FIG. 2, more detailed examples of a BS and a UE are provided elsewhere herein. Operations that may be performed in some embodiments for DM-RS overhead reduction in TDD massive MIMO, for example, are shown at 1010, 1012, 1014, 1016, 1018, 1020.

During a training phase, which may be online or offline, the UE 1006 determines appropriate sparse reference signaling, in this case sparse DM-RS signaling, that can be used to reduce overhead without significantly impacting performance in respect of determining channel coefficients or parameters. At 1010 the BS 1002 transmits (possibly full density) DM-RS signaling to the UE 1006. The UE 1006 performs channel estimation at 1012 based on the received DM-RS signaling. 1010, 1012 are repeated in some embodiments, for different channel realizations due to UE movement for example, until sufficient UE channel estimates in the form of channel measurements/estimation at DM-RS antenna ports are collected by the UE 1006.

Figure 10:
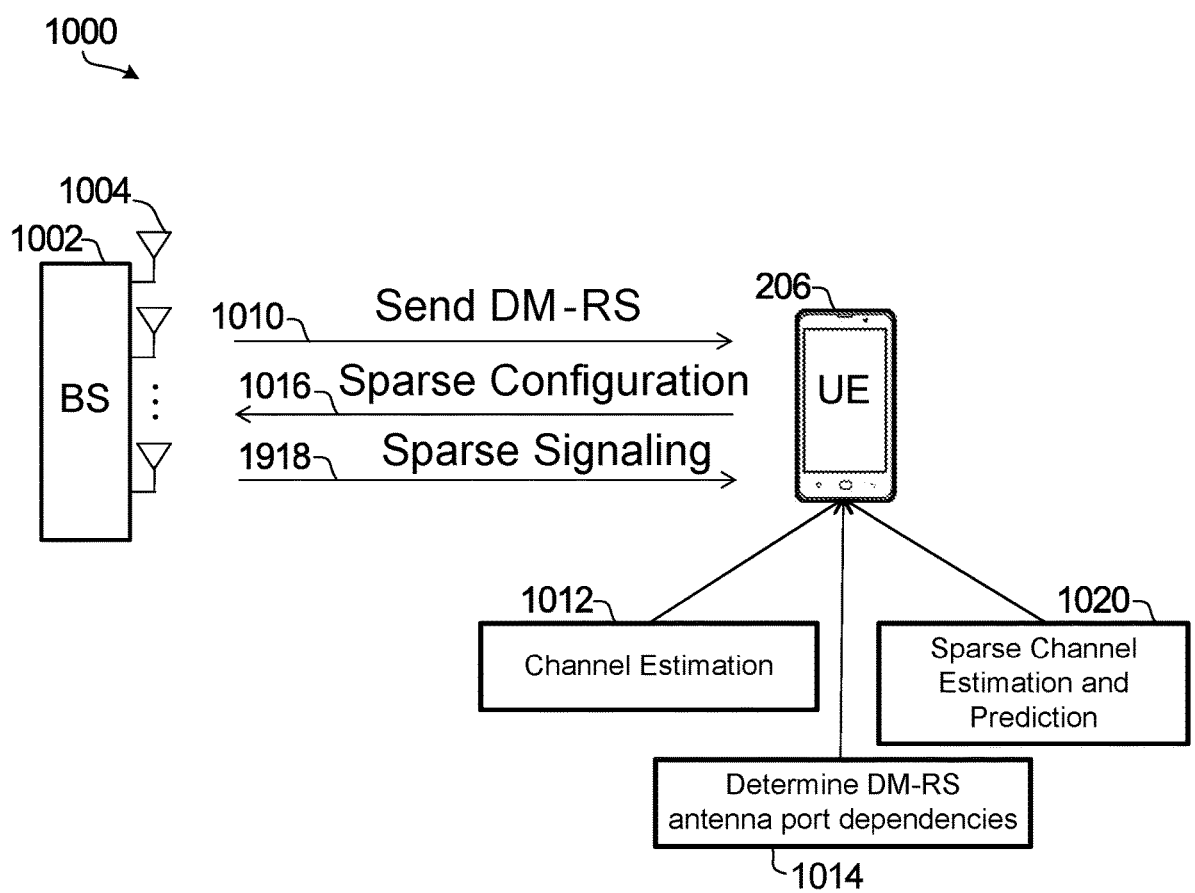
FIG. 10 is a block diagram illustrating a BS and a UE, and examples of operations that may be performed in further embodiments.

1014 in FIG. 10 represents determination, by the UE 1006, of channel dependencies across DM-RS antenna ports/time/frequency based on channel estimates collected at 1012. ML is used to implement 1014 in some embodiments. ML examples and others provided herein, including those disclosed in the context of CSI-RS embodiments, may also or instead be applied in determining antenna port dependencies in DM-RS overhead reduction embodiments, and generally to embodiments intended to reduce overhead associated with other types of reference signaling such as PT-RS signaling.

Based on the antenna port dependencies in the embodiment shown, the UE 1006 optimizes a sparse reference signaling pattern and corresponding predictor that is to be used for the UE 1006, and/or potentially other UEs as well as or instead of the UE 1006. A sparse reference signal pattern that is determined or otherwise obtained by a UE based on collected channel measurements need not necessarily be subsequently used only for that UE, as noted elsewhere herein.

An indication of the sparse reference signaling pattern(s) is transmitted from the UE 1006 to the BS 1002 at 1016. One or more of overall reference signaling density, reference signaling densities per antenna port or subset of antenna ports, and DM-RS configuration index or identifier, for example, may be transmitted from a UE to the BS 1002 at 1016 to inform the BS that a sparse reference signaling configuration has been determined and is to be applied. Examples of how a sparse signaling configuration may be determined are provided elsewhere herein, and may be implemented in a DM-RS/PT-RS application.

Sparse reference signaling consistent with the configuration is then transmitted by the BS 1002 at 1018, to the same UE 1006 and/or potentially another UE, and the UE performs channel estimation and prediction at 1020. This is similar to 1010, 1012 as discussed above, but involves sparse DM-RS signaling that includes only a subset of the DM-RSs from the DM-RS signaling at 1010. For channel estimation and prediction at 1020, the UE 1006 estimates the channel at pilot positions in the sparse reference signaling, predicts the channel at non-pilot positions, and uses the channel estimates along with the channel predictions to decode downlink data.

In some embodiments, the BS 1002 configures the UE 1006 for lower density reference signaling before 1018. This may be useful at least in a scenario in which a sparse reference signaling pattern that was determined or otherwise obtained by one UE is to be used by a base station for a different UE. The different UE can then receive from the base station any information that the UE needs to perform channel estimation based on the sparse reference signaling.

UE configuration may be performed even for a UE that determined the sparse reference signaling pattern that is to be used by the BS 1002.

Figure 11:
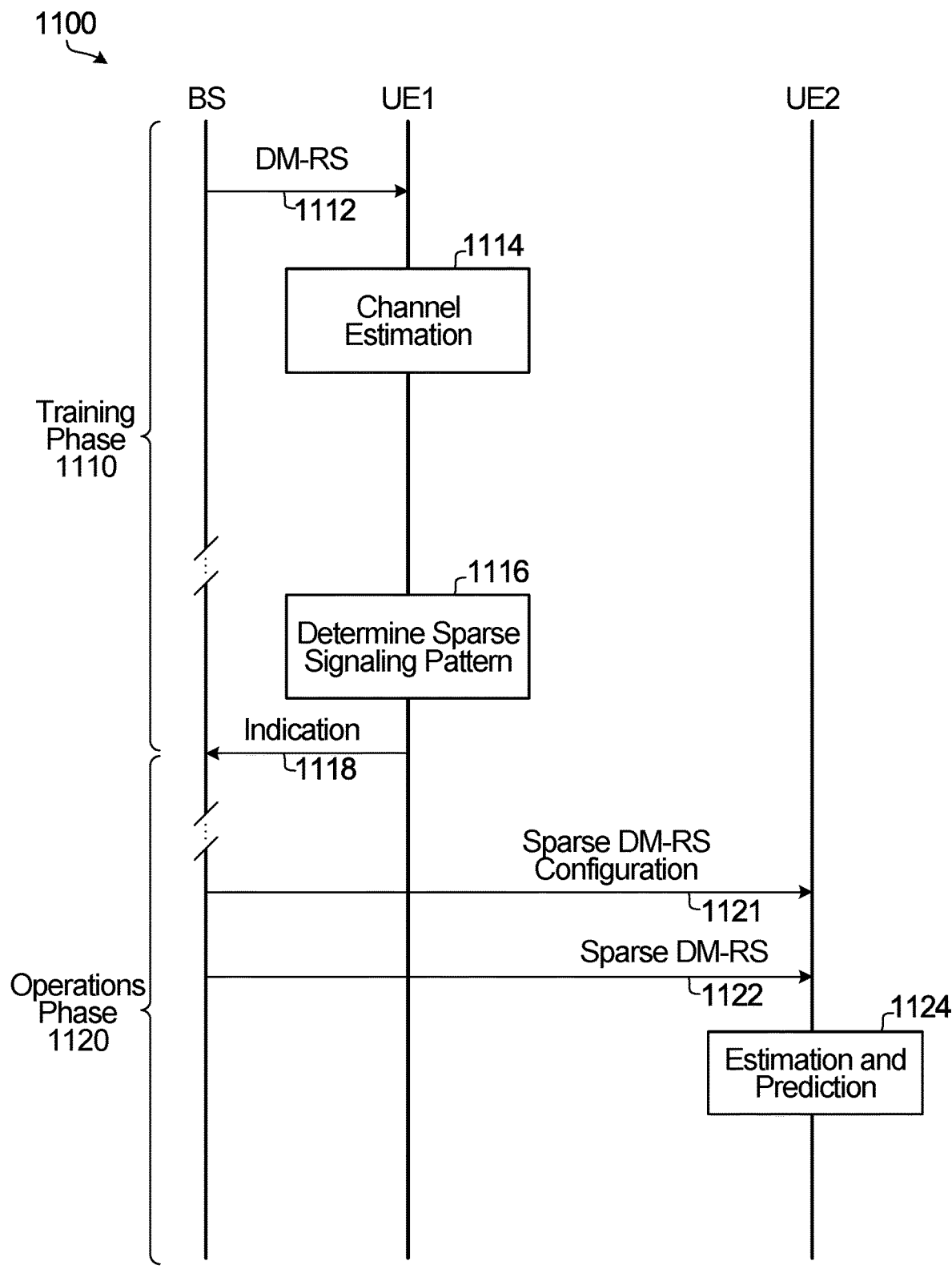
FIG. 11 is a signal flow diagram illustrating BS-UE signaling according to another embodiment.

FIG. 11 is a signal flow diagram illustrating BS-UE signaling according to another embodiment. In the signal flow diagram 1100, a BS and a UE, labeled as UE1, are involved in a training phase 1110, which may be online or offline. Although only one UE is involved in the training phase 1110 shown by way of example in FIG. 11, in other embodiments multiple UEs may be in a training phase with the BS and/or other BSs.

A DM-RS signaling exchange between the BS and UE1 is shown at 1112. This is similar to the DM-RS transmission at 1010 in FIG. 10, described above. The BS transmits (possibly dense) DM-RS signaling at 1112 and UE1 performs channel estimation at 1114. Although only one DM-RS transmission and channel estimation are shown at 1112, 1114 in FIG. 11, there may be multiple DM-RS transmission and channel estimations, as UE1 moves between multiple locations during a training phase for example.

A sparse reference signaling pattern, in this case for sparse DM-RS signaling that can be used to reduce DM-RS signaling overhead, is determined at 1116 based on channel estimates collected at 1114. Multiple sparse signaling patterns may be tested or evaluated by UE1 using the same set of training data from channel estimation at 1114.

In some embodiments, UE1 tracks and records its location during training, and associates location information with channel estimates at 1114 and/or the sparse signaling pattern(s) at 1116.

In some embodiments, UE1 transmits an indication to the BS at 1118 to signal the end of training and/or to provide the BS with an indication of the sparse reference signaling pattern that is to be used for UE1 and/or potentially one or more other UEs. UE location information, and/or other information, may also be signaled to the BS at 1118.

In the operations phase 1120, the sparse reference signaling pattern that is determined at 1116 is used in DM-RS signaling with UE2. In this example, training is not UE-specific. The training with UE1 during the training phase is applied to one or more other UEs, in this case UE2, and UE2 is configured with a sparse DM-RS configuration at 1121. Information that UE2 needs to perform channel prediction for non-pilot channels, for example, is transmitted to UE2 by the BS. In other embodiments, the BS uses a sparse reference signaling configuration only for the UE(s) that determined or otherwise obtained the sparse reference signaling pattern, and further configuration of the UE may or may not be performed at 1121.

Channel characteristics may vary depending on UE location, as noted elsewhere herein. The sparse reference signaling configuration that is used at 1122 may be UE location-dependent. The BS may determine the location of UE2, based on a UE location indication provided to the BS by UE2 or in some other way, and obtain a sparse reference signaling configuration for the current location of UE2. The BS may select from multiple sparse reference signaling configurations based on current UE location, for example.

At 1124, UE2 performs channel estimation and prediction based on the sparse DM-RS signaling received at 1122, and uses estimated and predicted channel information in demodulating data.

UE behaviors during the training phase 1110 in FIG. 11 include receiving dense DM-RS signaling at 1112, performing channel estimation at 1114, determining a sparse signalling pattern at 1116, and transmitting an indication to the BS at 1118. During the operations phase 1120, UE2 receives sparse DM-RS signaling from the BS at 1122 and performs estimation and prediction at 1124. UE2 may also transmit an indication of its location to the BS before 1122, and may receive configuration information at 1121.

BS behaviors during the training phase 1110 in FIG. 11 include transmitting dense DM-RS signaling at 1112 and receiving the indication at 1118. Other BS behaviors, during the operations phase 1120, include optionally transmitting sparse DM-RS configuration information at 1121 and transmitting sparse DM-RS signaling at 1122. A BS may also receive UE location information or otherwise determine UE location in some embodiments.

Implementation options disclosed elsewhere herein, with reference to CSI-RS embodiments for example, may also or instead be applied to DM-RS embodiments and/or to other embodiments such as PT-RS embodiments. Variations disclosed elsewhere herein may similarly apply to DM-RS embodiments and/or to other embodiments such as PT-RS embodiments.

Figure 12:
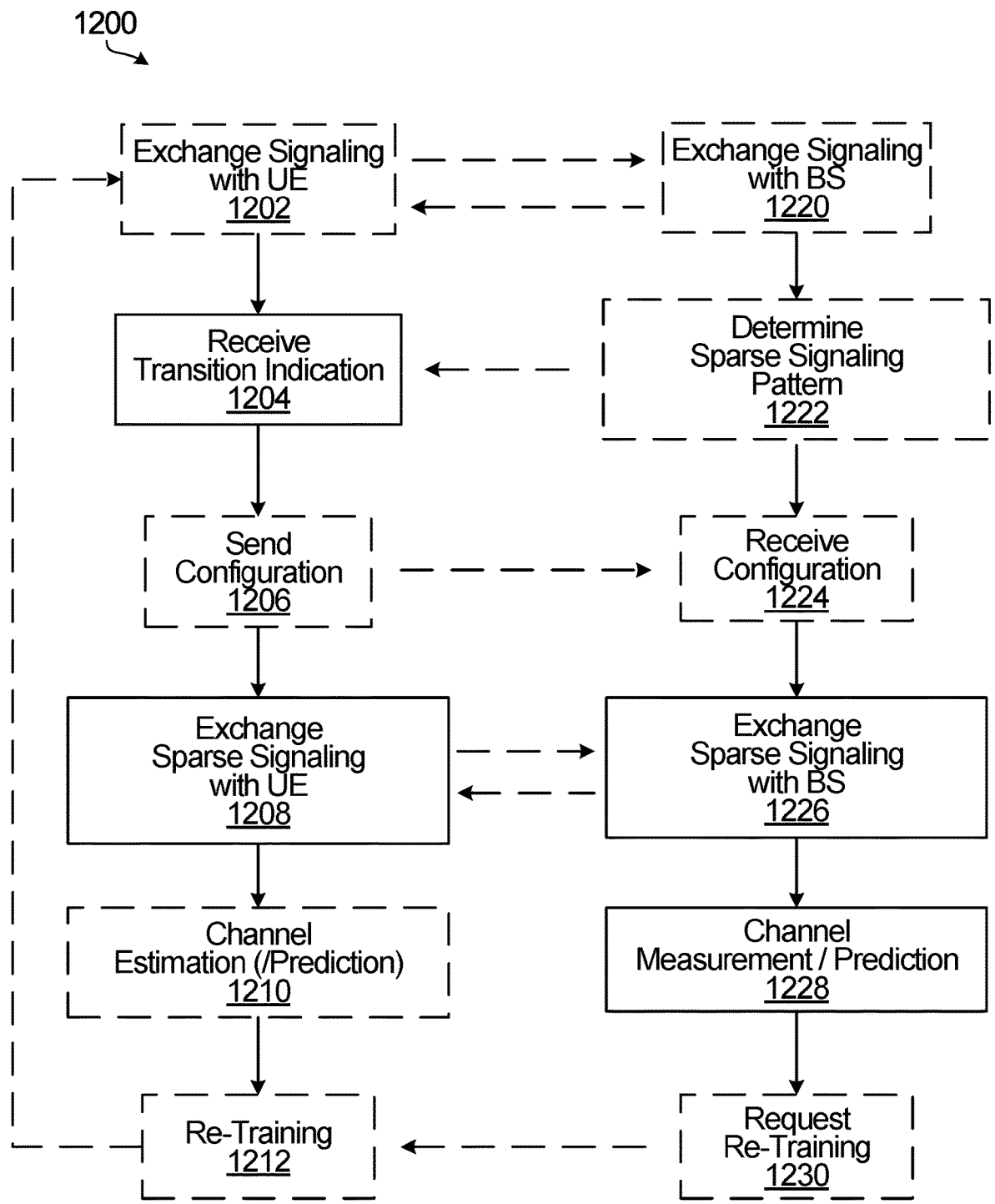
FIG. 12 is a flow chart illustrating an example of a method according to an embodiment.

FIG. 12 is a flow chart illustrating an example of a method according to an embodiment. The flow chart 1200 includes both network-side operations 1202, 1204, 1206, 1208, 1210, 1212 and UE-side operations 1220, 1222, 1224, 1226, 1228, 1230.

Although FIG. 12 shows other operations, in some embodiments the core of a method performed by network equipment in a wireless communication network involves receiving at 1204, from a UE, an indication that the network equipment is to transition to sparse reference signaling for the UE. The indication may be or include an indication of one or more parameters of the sparse signaling pattern, an indication of a location of the UE, or an indication of other information from which pattern may be determined or otherwise obtained.

The sparse reference signaling is consistent with a sparse signaling pattern determined based on previous reference signaling that was previously transmitted to the UE or another UE, at 1202 for example. The sparse reference signaling is transmitted to the UE at 1208. The network equipment may also receive signaling from the UE at 1202, 1208, and therefore these operations are shown in FIG. 12 as exchanging signaling with the UE. For example, the network equipment may transmit CSI-RS signaling to the UE at 1202 and/or 1208 and receive signaling in the form of CSI feedback from the UE. Similarly, one or more UEs may not only receive reference signaling from a BS at 1220, 1224, but may also transmit signaling such as CSI feedback to a BS at 1220, 1224.

The sparse signaling pattern is determined based on previous reference signaling that was previously transmitted to the UE or another UE. Although the reference signaling based upon which the sparse signaling pattern is determined is transmitted by the network equipment to the UE at 1202, in some embodiments the sparse signaling pattern may be determined by a different UE.

Determination of the sparse signaling pattern, shown at 1222 in FIG. 12, is part of a training phase in the examples shown in FIGS. 3 and 11. Such training may be offline or online. For offline training, the previous reference signaling transmitted to the UE at 1202 is for offline operation that is separate from the reference signaling at 1208 for communications with a UE. For online training, the reference signaling at 1202 is for online operation that is associated with communications with a UE. Therefore, although not shown in FIG. 12, the signaling exchanged at 1202, 1220 may be used by network equipment and/or a UE for channel estimation during normal communications.

In some embodiments, the sparse reference signaling exchanged at 1208, 1226 includes CSI-RS signaling, DM-RS signaling, or PT-RS signaling.

Some embodiments also involve transmitting, to the UE, configuration information to configure the UE for the sparse reference signaling, at 1206. The configuration information is received by the UE at 1224.

Although embodiments herein focus primarily on UE channel measurement and prediction, the network equipment may also perform channel estimation, and possibly channel prediction, at 1210.

Re-training may be supported in some embodiments, as shown at 1212. The network equipment may initiate re-training, or re-training may be requested by a UE at 1230. A UE may request retraining based on any one or more of: a threshold amount of time since previous training or re-training, movement of the UE by more than a threshold distance, an error detection rate above a threshold, and/or any of various other factors. Retraining may be initiated at the network side, based on these and/or other factors. In the case of network-initiated re-training, re-training need not be requested by a UE. Embodiments in which retraining may be network-initiated and UE-initiated are also possible.

Signaling to request retraining at 1230 is received by the network equipment at 1212. A re-training request provides to the network equipment an indication that the network equipment is to transition from the sparse reference signaling to dense reference signaling for the UE. This transition is not necessarily to full density signaling, but is to at least a signaling density that is higher than current sparse signaling. The network equipment makes the transition and then transmits, to the UE, the dense reference signaling.

According to another aspect of the present disclosure, a method performed by a UE in a wireless communication network involves receiving, from network equipment in the wireless communication network, sparse reference signaling that is determined based on previous reference signaling previously received by the UE or another UE, at 1226 for example, and performing channel measurement and prediction based on the received sparse reference signaling, at 1230.

In some embodiments, a training phase involves receiving the previous reference signaling, at 1220 for example, determining the sparse reference signaling based on the previous reference signaling, at 1222 for example, and transmitting to the network equipment an indication that the network equipment is to transition to the sparse reference signaling for the UE.

Training may be online, in which the UE receiving the previous reference signaling involves receiving the previous reference signaling for offline operation that is separate from communications with the network equipment, or offline, in which the UE receiving the previous reference signaling involves receiving the previous reference signaling for online operation that is associated with communications with the network equipment.

Features that are disclosed elsewhere herein may be implemented in conjunction with UE embodiments. For example, embodiments may include any one or more of the following features, in any of various combinations:

the sparse reference signaling is or includes CSI-RS signaling, DM-RS signaling, or PT-RS signaling;

the indication is or includes an indication of one or more parameters of the sparse signaling pattern;

the indication is or includes an indication of a location of the UE;

receiving, from the network equipment, configuration information to configure the UE for the sparse reference signaling;

transmitting to the network equipment, responsive to a condition at the UE, an indication that the network equipment is to transition from the sparse reference signaling to dense reference signaling for the UE—examples of re-training conditions are provided elsewhere herein;

receiving, from the network equipment, the dense reference signaling;

transmitting, to the network equipment, an indication that the network equipment is to transition to new sparse reference signaling that is determined based on the received dense reference signaling.

FIG. 12 and the description thereof are intended solely to provide further illustrative examples of method embodiments. Other embodiments may include more, fewer, and/or different operations, performed in a similar or different order. There may also be various ways to perform operations in a method, including those disclosed elsewhere herein.

Figure 13:
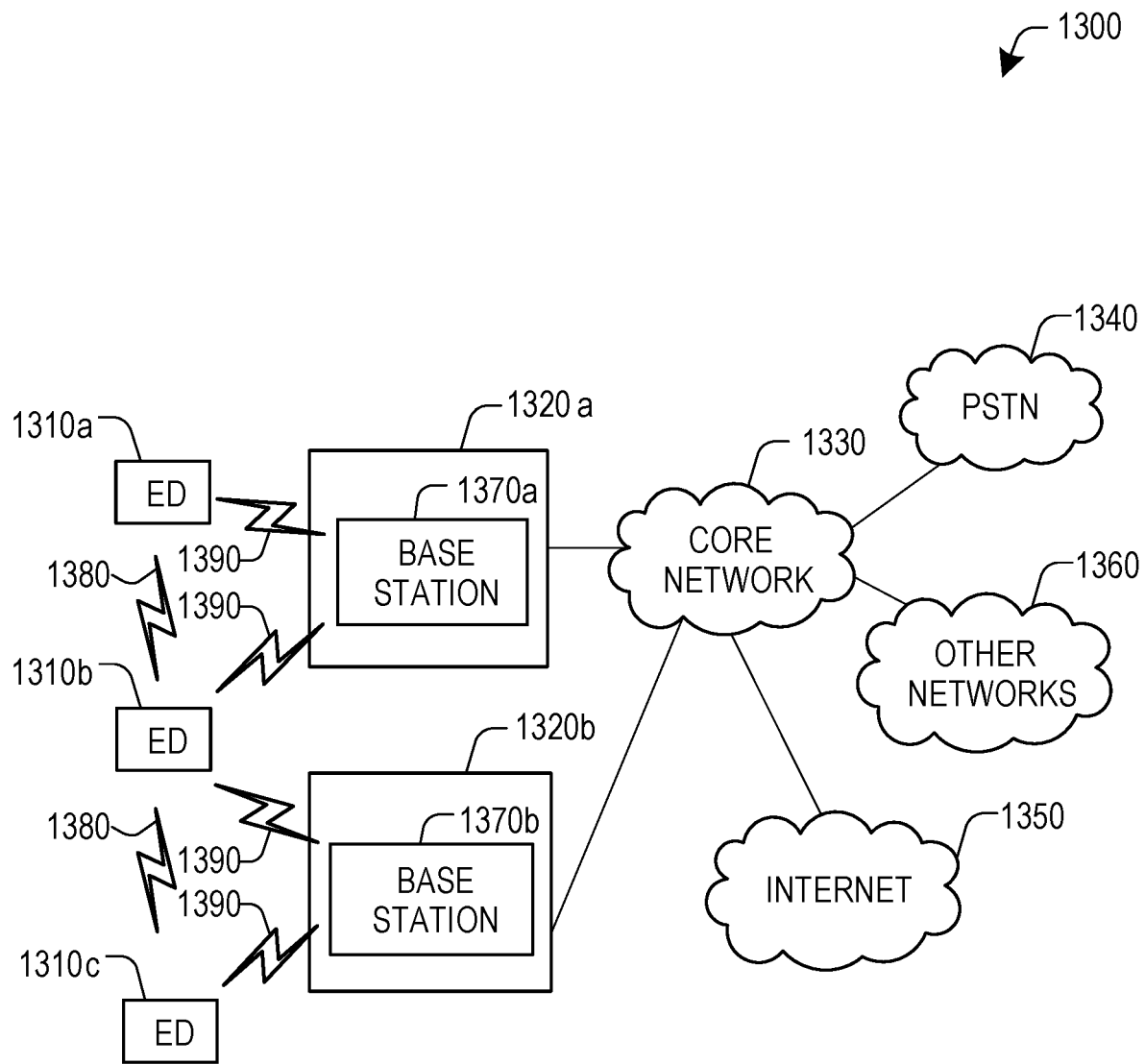
FIG. 13 illustrates an example communication system in which embodiments of the present disclosure could be implemented.

Various embodiments are disclosed by way of example above. FIG. 13 illustrates an example communication system 1300 in which embodiments of the present disclosure could be implemented. In general, the communication system 1300 enables multiple wireless or wired elements to communicate data and other content. The purpose of the communication system 1300 may be to provide content (voice, data, video, text) via broadcast, narrowcast, user device to user device, etc. The communication system 1300 may operate by sharing resources such as bandwidth.

In this example, the communication system 1300 includes electronic devices (ED) 1310*a*-1310*c*, radio access networks (RANs) 1320*a*-1320*b*, a core network 1330, a public switched telephone network (PSTN) 1340, the internet 1350, and other networks 1360. Although certain numbers of these components or elements are shown in FIG. 13, any reasonable number of these components or elements may be included in the communication system 1300.

The EDs 1310*a*-1310*c* are configured to operate, communicate, or both, in the communication system 1300. For example, the EDs 1310*a*-1310*c* are configured to transmit, receive, or both via wireless or wired communication channels. Each ED 1310*a*-1310*c* represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 13, the RANs 1320*a*-1320*b* include base stations 1370*a*-1370*b*, respectively. Each base station 1370*a*-1370*b* is configured to wirelessly interface with one or more of the EDs 1310*a*-1310*c* to enable access to any other base station 1370*a*-1370*b*, the core network 1330, the PSTN 1340, the internet 1350, and/or the other networks 1360. For example, the base stations 1370*a*-1370*b* may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 1310*a*-1310*c* may be alternatively or additionally configured to interface, access, or communicate with any other base station 1370*a*-1370*b*, the internet 1350, the core network 1330, the PSTN 1340, the other networks 1360, or any combination thereof. The communication system 1300 may include RANs wherein the corresponding base station accesses the core network 1330 via the internet 1350. In some embodiments the EDs 1310a-1310c include EDs that are able to communicate directly with each other through links 1380.

The EDs 1310a-1310c and base stations 1370a-1370b are examples of communication equipment that can be configured to implement some or all of the functionality and/or embodiments described herein. In the embodiment shown in FIG. 13, the base station 1370a forms part of the RAN 1320a, which may include other base stations, base station controller(s) (BSC), radio network controller(s) (RNC), relay nodes, elements, and/or devices. Any base station 1370a, 1370b may be a single element, as shown, or multiple elements, distributed in the corresponding RAN, or otherwise. Also, the base station 1370b forms part of the RAN 1320b, which may include other base stations, elements, and/or devices. Each base station 1370a-1370b transmits and/or receives wireless signals within a particular geographic region or area, sometimes referred to as a "cell" or "coverage area". A cell may be further divided into cell sectors, and a base station 1370a-1370b may, for example, employ multiple transceivers to provide service to multiple sectors. In some embodiments there may be established pico or femto cells where the radio access technology supports such cells. In some embodiments, multiple transceivers could be used for each cell, for example using multiple-input multiple-output (MIMO) technology. The number of RANs 1320a-1320b shown is an example only. Any number of RANs may be contemplated when devising the communication system 1300.

The base stations 1370a-1370b communicate with one or more of the EDs 1310a-1310c over one or more air interfaces 1390 using wireless communication links e.g. radio frequency (RF), microwave, infrared (IR), etc. The air interfaces 1390 may utilize any suitable radio access technology. For example, the communication system 1300 may implement one or more channel access methods, such as code division multiple access (CDMA), time division multiple access (TDMA), frequency division multiple access (FDMA), orthogonal frequency division multiple access (OFDMA), or single-carrier FDMA (SC-FDMA) in the air interfaces 1390.

A base station 1370a-1370b may implement Universal Mobile Telecommunication System (UMTS) Terrestrial Radio Access (UTRA) to establish an air interface 1390 using wideband CDMA (WCDMA). In doing so, the base station 1370a-1370b may implement protocols such as HSPA, HSPA+ optionally including HSDPA, HSUPA or both. Alternatively, a base station 1370a-1370b may establish an air interface 1390 with Evolved UTMS Terrestrial Radio Access (E-UTRA) using LTE, LTE-A, and/or LTE-B. It is contemplated that the communication system 1300 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 1320a-1320b are in communication with the core network 1330 to provide the EDs 1310a-1310c with various services such as voice, data, and other services. The RANs 1320a-1320b and/or the core network 1330 may be in direct or indirect communication with one or more other RANs (not shown), which may or may not be directly served by core network 1330, and may or may not employ the same radio access technology as RAN 1320a, RAN 1320b or both. The core network 1330 may also serve as a gateway access between (i) the RANs 1320a-1320b or EDs 1310a-1310c or both, and (ii) other networks (such as the PSTN 1340, the internet 1350, and the other networks 1360). In addition, some or all of the EDs 1310a-1310c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 1350. PSTN 1340 may include circuit switched telephone networks for providing plain old telephone service (POTS). Internet 1350 may include a network of computers and subnets (intranets) or both, and incorporate protocols, such as IP, TCP, UDP. EDs 1310a-1310c may be multimode devices capable of operation according to multiple radio access technologies, and incorporate multiple transceivers necessary to support such radio access technologies.

Figure 14A:
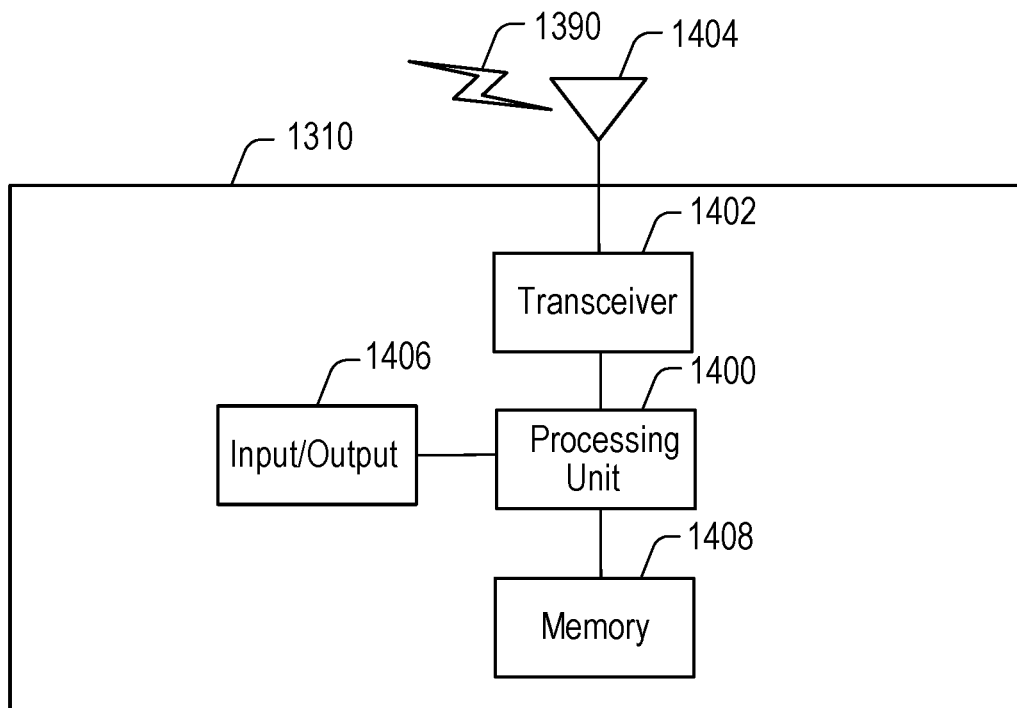
FIG. 14A is a block diagram of an example electronic device.
Figure 14B:
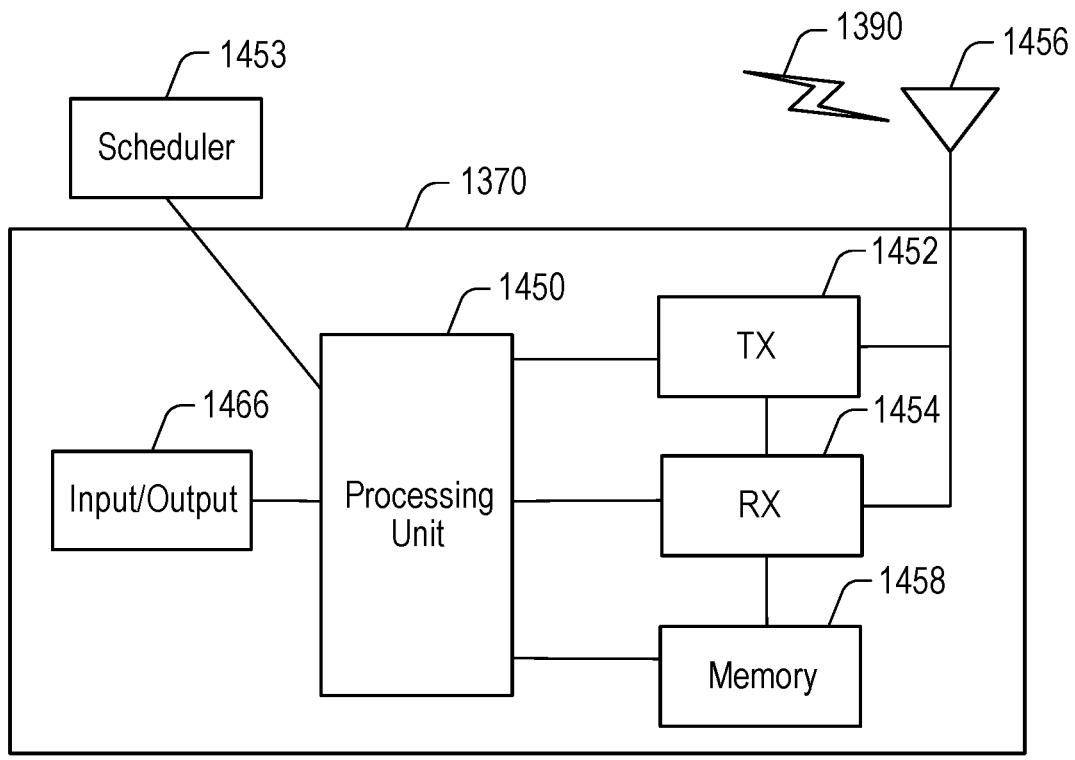
FIG. 14B is a block diagram of an example base station.

FIGS. 14A and 14B illustrate example devices that may implement the methods and teachings according to this disclosure. In particular, FIG. 14A illustrates an example ED 1310, and FIG. 14B illustrates an example base station 1370. These components could be used in the communication system 1300 or in any other suitable system.

As shown in FIG. 14A, the ED 1310 includes at least one processing unit 1400. The processing unit 1400 implements various processing operations of the ED 1310. For example, the processing unit 1400 could perform signal coding, data processing, power control, input/output processing, or any other functionality enabling the ED 1310 to operate in the communication system 1300. The processing unit 1400 may also be configured to implement some or all of the functionality and/or embodiments described in more detail herein. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1310 also includes at least one transceiver 1402. The transceiver 1402 is configured to modulate data or other content for transmission by at least one antenna or Network Interface Controller (NIC) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1310. One or multiple antennas 1404 could be used in the ED 1310. Although shown as a single functional unit, a transceiver 1402 could also be implemented using at least one transmitter and at least one separate receiver.

The ED 1310 further includes one or more input/output devices 1406 or interfaces (such as a wired interface to the internet 1350 in FIG. 13). The input/output devices 1406 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the ED 1310 includes at least one memory 1408. The memory 1408 stores instructions and data used, generated, or collected by the ED 1310. For example, the memory 1408 could store software instructions or modules configured to implement some or all of the functionality and/or embodiments described herein and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 1370 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler 1453 may be coupled to the processing unit 1450. The scheduler 1453 may be included within or operated separately from the base station 1370. The processing unit 1450 implements various processing operations of the base station 1370, such as signal coding, data processing, power control, input/output processing, or any other functionality. The processing unit 1450 can also be configured to implement some or all of the functionality and/or embodiments described in more detail herein. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more EDs or other devices. Each receiver 1454 includes any suitable structure for processing signals received wirelessly or by wire from one or more EDs or other devices. Although shown as separate components, at least one transmitter 1452 and at least one receiver 1454 could be combined into a transceiver. Each antenna 1456 includes any suitable structure for transmitting and/or receiving wireless or wired signals. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described above in connection to the ED 1310 in FIG. 14A. The memory 1458 stores instructions and data used, generated, or collected by the base station 1370. For example, the memory 1458 could store software instructions or modules configured to implement some or all of the functionality and/or embodiments described herein and that are executed by the processing unit(s) 1450.

Each input/output device 1466 permits interaction with a user or other devices in the network. Each input/output device 1466 includes any suitable structure for providing information to or receiving/providing information from a user, including network interface communications.

Figure 15:
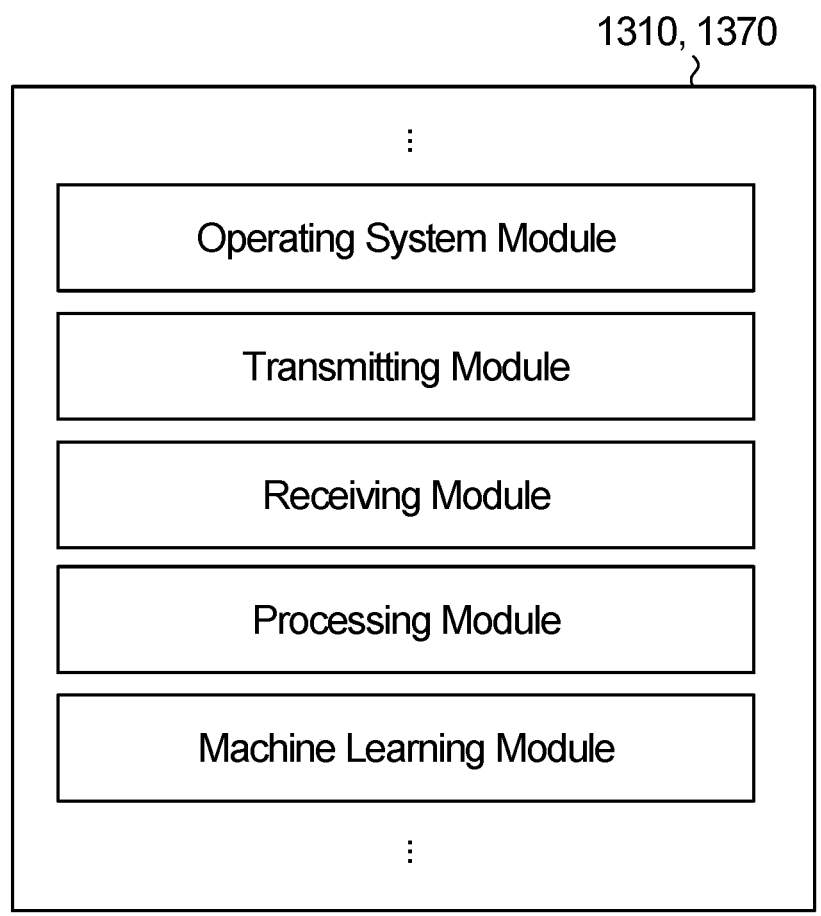
FIG. 15 is a block diagram of component modules.

It should be appreciated that one or more steps of the embodiment methods provided herein may be performed by corresponding units or modules, according to FIG. 15. For example, a signal may be transmitted by a transmitting unit or a transmitting module. A signal may be received by a receiving unit or a receiving module. A signal may be processed by a processing unit or a processing module. Other steps may be performed by an ML module. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs such as 1310 and base stations such as 1370 are known to those of skill in the art. As such, these details are omitted here.

In general, apparatus embodiments implementing methods as disclosed herein could take any of various forms. For example, in an embodiment, network equipment for a wireless communication network includes a plurality of antennas, a processor coupled to the plurality of antennas, and a processor-readable memory coupled to the processor. The base station 1370 is an example of such network equipment, with a plurality of antennas at 1456, a processor in the form of a processing unit 1450, and a processor-readable memory 1458 coupled to the processing unit.

The processor-readable memory stores processor-executable instructions which, when executed by the processor, cause the processor to perform a method as disclosed herein. In an embodiment, the instructions cause the processor to perform a method that involves receiving, from a UE, an indication that the network equipment is to transition to sparse reference signaling for the UE. The sparse reference signaling is consistent with a sparse signaling pattern determined based on previous reference signaling previously transmitted to the UE or another UE. The method also involves transmitting, to the UE, the sparse reference signaling consistent with the sparse signaling pattern.

Features that are described elsewhere herein are also applicable to user equipment embodiments. For example, embodiments may include any one or more of the following features, in any of various combinations:

the processor-executable instructions, when executed by the processor, further cause the processor to transmit the previous reference signaling to the UE or the other UE;

the processor-executable instructions, when executed by the processor, cause the processor to transmit the previous reference signaling for offline operation that is separate from communications with the UE or the other UE;

the processor-executable instructions, when executed by the processor, cause the processor to transmit the previous reference signaling for online operation that is associated with communications with the UE or the other UE;

the sparse reference signaling is or includes CSI-RS, DM-RS signaling, or PT-RS signaling;

the processor-executable instructions, when executed by the processor, further cause the processor to transmit, to the UE, configuration information to configure the UE for the sparse reference signaling;

the processor-executable instructions, when executed by the processor, further cause the processor to receive, from the UE, an indication that the network equipment is to transition from the sparse reference signaling to dense reference signaling for the UE, and to transmit, to the UE, the dense reference signaling.

Other network equipment embodiments are also possible. For example, the description above focuses on network equipment. A wireless communication network will likely include multiple installations of network equipment. In an embodiment, a wireless communication network includes multiple base stations, with at least some of those base stations being implemented as, or at least including, network equipment as disclosed herein. For example, each installation of network equipment may be provided for training one or more respective ML modules for each base station, and for supporting ML-assisted reference signaling reduction for communications between each base station and UEs at locations within the network.

Method and apparatus embodiments described herein encompass both training and operations. Considering operations separately from training, in some embodiments a network equipment method or operation involves receiving from a UE an indication of a current location of the UE in the wireless communication network, and using the current location of the UE as an input to obtain a sparse reference signaling pattern as disclosed herein.

Method embodiments and network equipment embodiments represent illustrative example implementations of features disclosed herein. Other embodiments are also possible. At least some features disclosed herein are applicable to UEs. For example, at a UE side, sparse reference signaling is received and used for channel estimation and/or acquisition. In a CSI-RS embodiment, channel predictions using estimated channels from CSI-RS can be used for the purpose of codebook-based CSI feedback to network equipment. In a DM-RS/PT-RS embodiment, channel predictions using estimated channels from DM-RS/PT-RS can used for data demodulation at a UE.

For example, according to a further embodiment, a UE includes a processor and a processor-readable memory, coupled to the processor, storing processor-executable instructions which, when executed by the processor, cause the processor to perform a method that involves receiving, from network equipment in the wireless communication network, sparse reference signaling determined based on previous reference signaling previously received by the UE or another UE, and performing channel measurement and prediction based on the received sparse reference signaling.

Features that are described elsewhere herein are also applicable to network equipment embodiments. For example, embodiments may include any one or more of the following features, in any of various combinations:

the processor-executable instructions, when executed by the processor, further cause the processor to receive the previous reference signaling and to determine the sparse reference signaling based on the previous reference signaling;

the processor-executable instructions, when executed by the processor, cause the processor to receive the previous reference signaling for offline operation that is separate from channel estimation for communications with the network equipment;

the processor-executable instructions, when executed by the processor, cause the processor to receive the previous reference signaling for online operation that is associated with communications with the network equipment;

the sparse reference signaling is or includes CSI-RS, DM-RS, or PT-RS;

the indication is or includes an indication of one or more parameters of the sparse signaling pattern;

the indication is or includes an indication of a location of the UE;

the processor-executable instructions, when executed by the processor, further cause the processor to receive, from the network equipment, configuration information to configure the UE for the sparse reference signaling;

the processor-executable instructions, when executed by the processor, further cause the processor to transmit to the network equipment, responsive to a condition at the UE, an indication that the network equipment is to transition from the sparse reference signaling to dense reference signaling for the UE, to receive, from the network equipment, the dense reference signaling, and to transmit, to the network equipment, an indication that the network equipment is to transition to new sparse reference signaling that is determined based on the received dense reference signaling.

Features disclosed herein could also or instead be implemented in the form of processor-executable instructions stored in a processor-readable memory.

In some embodiments, such processor-executable instructions, when executed by a processor in network equipment in a wireless communication network, cause the processor to perform a method that includes receiving, from a UE, an indication that the network equipment is to transition to sparse reference signaling for the UE, and transmitting, to the UE, the sparse reference signaling consistent with the sparse signaling pattern. The sparse reference signaling is consistent with a sparse signaling pattern determined based on previous reference signaling previously transmitted to the UE or another UE.

According to another embodiment, the processor-executable instructions, when executed by a processor in a UE for a wireless communication network, cause the processor to perform a method that includes receiving, from network equipment in the wireless communication network, sparse reference signaling determined based on previous reference signaling previously received by the UE or another UE, and performing channel measurement and prediction based on the received sparse reference signaling.

Other features that are disclosed elsewhere herein are also applicable to methods that are implemented in the form of processor-executable instructions stored in processor-readable memory.

In general, embodiments disclosed herein support new, potentially lower density reference signaling configurations, for CSI-RS, DM-RS, and/or PT-RS for example. Some embodiments introduce hopping between reference signaling patterns, such as in alternating time slots and/or RBs.

Per antenna port signaling configuration is possible.

Embodiments disclosed herein enable network equipment and/or UEs to take advantage of channel spatial correlation along with correlations in both time and frequency. Channel correlations in multiple dimensions allow for balanced RS port design in some embodiments. Dimensions are associated with a four-dimensional grid of transmit antenna port index, receive antenna port index, subcarrier index, and OFDM symbol index in some embodiments. Minimization, or at least reduction, of reference signaling usage such as CSI-RS usage, DM-RS usage, and/or PT-RS usage is supported by introducing sparse CSI-RS, DM-RS, and/or PT-RS signaling patterns. A UE uses channel estimates at CSI-RS/DM-RS/PT-RS locations across to predict a channel at other desired grid locations in some embodiments. At the UE side, machine learning may be used for predicting a channel, although other implementations are also possible.

Some embodiments introduce UE to BS signaling to indicate completion of training, and/or a sparse reference signaling pattern that has been selected or otherwise obtained by the UE. UE to BS signaling may also or instead indicate from a UE to a BS that re-training is to be performed. Training and/or re-training may be offline and online.

Under a sparse reference signaling configuration a UE uses estimation and prediction to generate CSI for feedback to a BS or to demodulate subsequently received data. Prediction uses machine learning in some embodiments. For example, if reference signaling is DM-RS/PT-RS, a UE uses channel predictions to decode downlink data; if reference signaling is CSI-RS, a UE uses channel predictions to derive CSI such as CQI, RI, PMI to be fed back to network equipment.

Multiple reference signaling configurations, including balanced or unequal density pattern across antenna ports, may be supported. For example, a separate ML module may be trained for each of multiple reference signaling configurations, with each configuration corresponding to a pilot pattern or partition in some embodiments. The same training data can be used for training of all ML modules.

Numerous modifications and variations of the present disclosure are possible in light of the above teachings. It is therefore to be understood that within the scope of the appended claims, the disclosure may be practiced otherwise than as specifically described herein.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

Although this disclosure refers to illustrative embodiments, the disclosure is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as processor-executable or computer-executable instructions stored on a non-transitory processor-readable or computer-readable medium, for example. Such media could store programming or instructions to perform any of various methods consistent with the present disclosure.

Moreover, any module, component, or device exemplified herein that executes instructions may include or otherwise have access to a non-transitory computer-/processor-readable storage medium or media for storage of information, such as computer-/processor-readable instructions, data structures, program modules, and/or other data. A non-exhaustive list of examples of non-transitory computer-/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer-/processor-readable storage media may be part of a device or accessible or connectable thereto. Any application or module herein described may be implemented using computer-/processor-readable/executable instructions that may be stored or otherwise held by such non-transitory computer-/processor-readable storage media.

The invention claimed is:

1. A method performed by network equipment in a wireless communication network, the method comprising:
   transmitting reference signaling to a User Equipment (UE), wherein the reference signaling comprises: Channel State Information Reference Signal (CSI-RS) signaling or Phase Tracking Reference Signal (PT-RS) signaling;
   receiving, from the UE, an indication of a sparse signaling pattern that is determined by the UE based on the reference signaling, wherein the indication comprises an indication of one or more parameters of the sparse signaling pattern;
   receiving, from the UE, an indication that the network equipment is to transition to sparse reference signaling, the sparse reference signaling being consistent with the sparse signaling pattern determined by the UE;
   transmitting, to the UE, the sparse reference signaling consistent with the sparse signaling pattern,
   wherein the sparse reference signaling comprises: CSI-RS signaling or PT-RS signaling,
   wherein transmitting the reference signaling comprises transmitting the reference signaling to the UE for offline training at the UE to determine the sparse signaling pattern, wherein the reference signaling is separate from reference signaling for communications with the UE.

2. The method of claim 1, wherein transmitting the reference signaling comprises transmitting the reference signaling to the UE for online training at the UE to determine the sparse signaling pattern, wherein the reference signaling is associated with communications with the UE.

3. The method of claim 1, wherein the method further comprises:
transmitting, to another UE, configuration information to configure the other UE for the sparse reference signaling;
transmitting, to the other UE, sparse reference signaling consistent with the sparse signaling pattern determined by the UE.

4. The method of claim 1, further comprising:
receiving, from the UE, an indication that the network equipment is to transition from the sparse reference signaling to dense reference signaling for the UE, wherein the dense reference signaling comprises: CSI-RS signaling or PT-RS signaling;
transmitting, to the UE, the dense reference signaling.

5. The method of claim 1, wherein the sparse signaling pattern is determined by the UE based on measurements that are made by the UE using the reference signaling and based on antenna port dependencies.

6. The method of claim 5, wherein the sparse signaling pattern has a corresponding predictor, determined by the UE, for predicting one or more elements of a channel based on the sparse reference signaling.

7. The method of claim 6, wherein the predictor is determined by the UE by training a Machine Learning (ML) module, using the measurements, to learn the antenna port dependencies.

8. The method of claim 7, wherein the indication of the sparse signaling pattern signals to the network equipment an end of the training.

9. The method of claim 1, wherein the one or more parameters of the sparse signaling pattern comprise any of:
pilot antenna port indices for the sparse signaling pattern;
non-pilot antenna port indices for the sparse signaling pattern;
per antenna port pilot locations for which pilots are and are not to be transmitted;
a subset of base antenna ports in a time-frequency grid, wherein the subset constitutes the sparse signaling pattern;
per-antenna port designations of individual antenna ports as pilot or non-pilot.

10. The method of claim 1, wherein the one or more parameters of the sparse signaling pattern comprise any of:
an index or identifier of the sparse signaling pattern;
time-frequency grid locations corresponding to pilot positions in the sparse signaling pattern;
time-frequency grid locations corresponding to non-pilot positions in the sparse signaling pattern;
a difference between a base pattern and the sparse signaling pattern;
a representation of on and off pilot locations in the sparse signaling pattern.

11. The method of claim 1, wherein the sparse signaling pattern is determined by the UE as part of a training phase, wherein the training phase further comprises transmitting the reference signaling by network equipment to the UE.

12. The method of claim 11, further comprising:
transmitting dense reference signaling to the UE for re-training at the UE.

13. The method of claim 12, further comprising:
receiving from the UE, before transmitting the dense reference signaling to the UE, signaling to request the re-training, wherein the signaling to request the re-training provides to the network equipment an indication that the network equipment is to transition from the sparse reference signaling to the dense reference signaling for the UE.

14. The method of claim 12, wherein the network equipment initiates the re-training and transmits the dense reference signaling to the UE.

15. Network equipment for a wireless communication network, the network equipment comprising:
a processor; and
a processor-readable memory, coupled to the processor, and storing processor-executable instructions which, when executed by the processor, cause the processor to perform a method comprising:
transmitting reference signaling to a User Equipment (UE), wherein the reference signaling comprises: Channel State Information Reference Signal (CSI-RS) signaling or Phase Tracking Reference Signal (PT-RS) signaling;
receiving, from the UE, an indication of a sparse signaling pattern that is determined by the UE based on the reference signaling, wherein the indication comprises an indication of one or more parameters of the sparse signaling pattern;
receiving, from the UE, an indication that the network equipment is to transition to sparse reference signaling, the sparse reference signaling being consistent with the sparse signaling pattern determined by the UE;
transmitting, to the UE, the sparse reference signaling consistent with the sparse signaling pattern,
wherein the sparse reference signaling comprises: CSI-RS signaling or PT-RS signaling,
the processor-executable instructions, when executed by the processor, causing the processor to transmit the reference signaling for offline training at the UE to determine the sparse signaling pattern, wherein the reference signaling is separate from reference signaling for communications with the UE.

16. The network equipment of claim 15, the processor-executable instructions, when executed by the processor, causing the processor to transmit the reference signaling for online training at the UE to determine the sparse signaling pattern, wherein the reference signaling is associated with communications with the UE.

17. The network equipment of claim 15, the processor-executable instructions, when executed by the processor, further causing the processor to:
transmit, to another UE, configuration information to configure the other UE for the sparse reference signaling;
transmit, to the other UE, sparse reference signaling consistent with the sparse signaling pattern determined by the UE.

18. The network equipment of claim 15, the processor-executable instructions, when executed by the processor, further causing the processor to:
receive, from the UE, an indication that the network equipment is to transition from the sparse reference signaling to dense reference signaling for the UE, wherein the dense reference signaling comprises: CSI-RS signaling or PT-RS signaling;
transmit, to the UE, the dense reference signaling.

19. A processor-readable memory storing processor-executable instructions which, when executed by a processor in network equipment in a wireless communication network, cause the processor to perform a method comprising:

transmitting reference signaling by the network equipment to a User Equipment (UE), wherein the reference signaling comprises: Channel State Information Reference Signal (CSI-RS) signaling or Phase Tracking Reference Signal (PT-RS) signaling;
receiving, by the network equipment from the UE, an indication of a sparse signaling pattern that is determined by the UE based on the reference signaling, wherein the indication comprises an indication of one or more parameters of the sparse signaling pattern;
receiving, by the network equipment from the UE, an indication that the network equipment is to transition to sparse reference signaling, the sparse reference signaling being consistent with the sparse signaling pattern determined by the UE;
transmitting, by the network equipment to the UE, the sparse reference signaling consistent with the sparse signaling pattern,
wherein the sparse reference signaling comprises: CSI-RS signaling or PT-RS signaling,
wherein transmitting the reference signaling comprises transmitting the reference signaling to the UE for offline training at the UE to determine the sparse signaling pattern, wherein the reference signaling is separate from reference signaling for communications with the UE.

20. A method performed by a User Equipment (UE) in a wireless communication network, the method comprising:
receiving reference signaling from network equipment in the wireless communication network, wherein the reference signaling comprises: Channel State Information Reference Signal (CSI-RS) signaling or Phase Tracking Reference Signal (PT-RS) signaling;
transmitting to the network equipment an indication of a sparse signaling pattern that is determined by the UE based on the reference signaling received by the UE, wherein the indication comprises an indication of one or more parameters of the sparse signaling pattern;
receiving, from the network equipment, sparse reference signaling consistent with the sparse signaling pattern determined by the UE;
performing channel measurement and prediction based on the received sparse reference signaling,
wherein the sparse reference signaling comprises: CSI-RS signaling or PT-RS signaling,
wherein receiving the reference signaling comprises receiving the reference signaling for offline training at the UE to determine the sparse signaling pattern, wherein the reference signaling is separate from reference signaling for communications with the network equipment.

21. The method of claim 20, further comprising:
transmitting to the network equipment an indication that the network equipment is to transition to the sparse reference signaling for the UE.

22. The method of claim 21, wherein receiving the reference signaling comprises receiving the reference signaling for online training at the UE to determine the sparse signaling pattern, wherein the reference signaling is associated with communications with the network equipment.

23. The method of claim 20, further comprising:
transmitting to the network equipment, responsive to a condition at the UE, an indication that the network equipment is to transition from the sparse reference signaling to dense reference signaling for the UE, wherein the dense reference signaling comprises: CSI-RS signaling or PT-RS signaling;
receiving, from the network equipment, the dense reference signaling;
determining, based on the received dense reference signaling, new sparse reference signaling, wherein the new sparse reference signaling comprises: CSI-RS signaling or PT-RS signaling;
transmitting, to the network equipment, an indication that the network equipment is to transition to the new sparse reference signaling that is determined based on the received dense reference signaling.

24. A User Equipment (UE) for a wireless communication network, the UE comprising:
a processor; and
a processor-readable memory, coupled to the processor, and storing processor-executable instructions which, when executed by the processor, cause the processor to perform a method comprising:
receiving reference signaling from network equipment in the wireless communication network, wherein the reference signaling comprises: Channel State Information Reference Signal (CSI-RS) signaling or Phase Tracking Reference Signal (PT-RS) signaling;
transmitting to the network equipment an indication of a sparse signaling pattern that is determined by the UE based on the reference signaling received by the UE, wherein the indication comprises an indication of one or more parameters of the sparse signaling pattern;
receiving, from the network equipment, sparse reference signaling consistent with the sparse signaling pattern determined by the UE;
performing channel measurement and prediction based on the received sparse reference signaling,
wherein the sparse reference signaling comprises: CSI-RS signaling or PT-RS signaling,
the processor-executable instructions, when executed by the processor, causing the processor to receive the reference signaling for offline training at the UE to determine the sparse signaling pattern, wherein the reference signaling is separate from reference signaling for channel estimation for communications with the network equipment.

25. The UE of claim 24, the processor-executable instructions, when executed by the processor, further causing the processor to:
transmit to the network equipment an indication that the network equipment is to transition to the sparse reference signaling.

26. The UE of claim 25, the processor-executable instructions, when executed by the processor, causing the processor to receive the reference signaling for online training at the UE to determine the sparse signaling pattern, wherein the reference signaling is associated with communications with the network equipment.

27. The UE of claim 24, the processor-executable instructions, when executed by the processor, further causing the processor to:
transmit to the network equipment, responsive to a condition at the UE, an indication that the network equipment is to transition from the sparse reference signaling to dense reference signaling for the UE, wherein the dense reference signaling comprises: CSI-RS signaling or PT-RS signaling;
receive, from the network equipment, the dense reference signaling;

determine, based on the received dense reference signaling, new sparse reference signaling, wherein the new sparse reference signaling comprises: CSI-RS signaling or PT-RS signaling;

transmit, to the network equipment, an indication that the network equipment is to transition to the new sparse reference signaling that is determined based on the received dense reference signaling.

28. A processor-readable memory storing processor-executable instructions which, when executed by a processor in a User Equipment (UE) for a wireless communication network, cause the processor to perform a method comprising:

receiving reference signaling from network equipment in the wireless communication network, wherein the reference signaling comprises: Channel State Information Reference Signal (CSI-RS) signaling or Phase Tracking Reference Signal (PT-RS) signaling;

transmitting to the network equipment an indication of a sparse signaling pattern that is determined by the UE based on the reference signaling received by the UE, wherein the indication comprises an indication of one or more parameters of the sparse signaling pattern;

receiving, from the network equipment, sparse reference signaling consistent with the sparse signaling pattern determined by the UE;

performing channel measurement and prediction based on the received sparse reference signaling, wherein the sparse reference signaling comprises: CSI-RS signaling or PT-RS signaling, wherein receiving the reference signaling comprises receiving the reference signaling for offline training at the UE to determine the sparse signaling pattern, wherein the reference signaling is separate from reference signaling for communications with the network equipment.

\* \* \* \* \*